(12) United States Patent
Kodeboyina et al.

(10) Patent No.: US 11,310,099 B2
(45) Date of Patent: Apr. 19, 2022

(54) IDENTIFYING AND MARKING FAILED EGRESS LINKS IN DATA PLANE

(71) Applicant: Barefoot Networks, Inc., Santa Clara, CA (US)

(72) Inventors: Chaitanya Kodeboyina, Los Altos, CA (US); John Cruz, Cupertino, CA (US); Steven Licking, San Jose, CA (US); Michael E. Attig, Sunnyvale, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/903,305

(22) Filed: Jun. 16, 2020

(65) Prior Publication Data

US 2020/0313955 A1    Oct. 1, 2020

Related U.S. Application Data

(63) Continuation of application No. 16/048,202, filed on Jul. 27, 2018, now abandoned, which is a
(Continued)

(51) Int. Cl.
| | |
|---|---|
| *H04L 12/24* | (2006.01) |
| *H04L 29/06* | (2006.01) |
| *H04L 12/741* | (2013.01) |
| *H04L 12/935* | (2013.01) |
| *H04L 12/717* | (2013.01) |
| *H04L 12/715* | (2013.01) |
| *H04L 41/0654* | (2022.01) |
| *H04L 69/22* | (2022.01) |

(Continued)

(52) U.S. Cl.
CPC ...... *H04L 41/0654* (2013.01); *H04L 41/0677* (2013.01); *H04L 45/28* (2013.01); *H04L 45/42* (2013.01); *H04L 45/64* (2013.01); *H04L 45/745* (2013.01); *H04L 49/3063* (2013.01); *H04L 49/555* (2013.01); *H04L 69/22* (2013.01)

(58) Field of Classification Search
None
See application file for complete search history.

(56) References Cited

U.S. PATENT DOCUMENTS

| | | |
|---|---|---|
| 4,490,785 A | 12/1984 | Strecker et al. |
| 5,068,892 A | 11/1991 | Livanos |
| | (Continued) | |

OTHER PUBLICATIONS

"L2 EtherChannel Load Balancing", Cisco Community, https://www.cisco.com/c/en/us/support/docs/lan-switching/etherchannel/12023-4.html, Jun. 30, 2015, 11 pages.
(Continued)

*Primary Examiner* — Peter Chen
*Assistant Examiner* — Jeff Banthrongsack
(74) *Attorney, Agent, or Firm* — Compass IP Law PC

(57) ABSTRACT

A method of identifying a failed egress path of a hardware forwarding element. The method detects an egress link failure in a data plane of the forwarding element. The method generates a link failure signal in the data plane identifying the failed egress link. The method generates a packet that includes the identification of the egress link based on the link failure signal. The method sets the status of the egress link to failed in the data plane based on the identification of the egress link in the generated packet.

6 Claims, 17 Drawing Sheets

Related U.S. Application Data continuation of application No. 15/150,015, filed on May 9, 2016, now Pat. No. 10,063,407.

(60) Provisional application No. 62/292,498, filed on Feb. 8, 2016.

(51) Int. Cl.
| | |
|---|---|
| *H04L 45/745* | (2022.01) |
| *H04L 41/0677* | (2022.01) |
| *H04L 49/00* | (2022.01) |
| *H04L 45/42* | (2022.01) |
| *H04L 49/55* | (2022.01) |
| *H04L 45/28* | (2022.01) |
| *H04L 45/64* | (2022.01) |

(56) References Cited

U.S. PATENT DOCUMENTS

| | | | |
|---|---|---|---|
| 5,757,795 | A | 5/1998 | Schnell |
| 5,987,521 | A | 11/1999 | Arrowood et al. |
| 7,110,404 | B1 | 9/2006 | Temoshenko |
| 7,190,696 | B1 | 3/2007 | Manur et al. |
| 7,664,873 | B1 | 2/2010 | Ghosh et al. |
| 7,953,089 | B1 | 5/2011 | Ramakrishnan et al. |
| 8,553,582 | B1 | 10/2013 | Mizrahi et al. |
| 9,319,347 | B1 | 4/2016 | Sindhu et al. |
| 9,559,985 | B1 | 1/2017 | Ye et al. |
| 9,565,114 | B1 | 2/2017 | Kabbani et al. |
| 9,571,400 | B1 | 2/2017 | Mandal et al. |
| 9,608,913 | B1 | 3/2017 | Kabbani et al. |
| 9,680,749 | B2 | 6/2017 | Labonte et al. |
| 9,860,081 | B2 | 1/2018 | Keesara et al. |
| 9,876,719 | B2 | 1/2018 | Revah et al. |
| 10,063,407 | B1 | 8/2018 | Kodeboyina et al. |
| 10,237,206 | B1 | 3/2019 | Agrawal et al. |
| 10,313,231 | B1 | 6/2019 | Bosshart |
| 10,404,619 | B1 | 9/2019 | Agrawal et al. |
| 10,728,173 | B1 | 7/2020 | Agrawal et al. |
| 2001/0042130 | A1 | 11/2001 | Brown |
| 2002/0141403 | A1 | 10/2002 | Akahane et al. |
| 2002/0159466 | A1 | 10/2002 | Rhoades |
| 2003/0204631 | A1 | 10/2003 | Pinkerton et al. |
| 2004/0091104 | A1 | 5/2004 | Kawamura et al. |
| 2004/0235480 | A1 | 11/2004 | Rezaaifar et al. |
| 2005/0078601 | A1 | 4/2005 | Moll et al. |
| 2005/0147095 | A1 | 7/2005 | Guerrero et al. |
| 2006/0045088 | A1 | 3/2006 | Nguyen |
| 2006/0245361 | A1 | 11/2006 | Cheethirala et al. |
| 2007/0047453 | A1 | 3/2007 | Bender et al. |
| 2007/0053283 | A1 | 3/2007 | Bidwell et al. |
| 2007/0086364 | A1 | 4/2007 | Ellis et al. |
| 2007/0177594 | A1 | 8/2007 | Kompella |
| 2007/0250713 | A1 | 10/2007 | Rahman et al. |
| 2008/0114892 | A1 | 5/2008 | Bruno et al. |
| 2008/0151890 | A1 | 6/2008 | Zelig et al. |
| 2009/0307241 | A1 | 12/2009 | Schimunek et al. |
| 2010/0020680 | A1 | 1/2010 | Salam et al. |
| 2012/0020206 | A1 | 1/2012 | Busi et al. |
| 2013/0028072 | A1 | 1/2013 | Addanki |
| 2013/0083660 | A1 | 4/2013 | Rajagopalan et al. |
| 2013/0177016 | A1 | 7/2013 | Nakano et al. |
| 2013/0279504 | A1 | 10/2013 | Gulati et al. |
| 2013/0322231 | A1 | 12/2013 | Császár et al. |
| 2013/0322232 | A1 | 12/2013 | Császár et al. |
| 2014/0040477 | A1 | 2/2014 | King et al. |
| 2015/0055652 | A1 | 2/2015 | Yong et al. |
| 2015/0127701 | A1 | 5/2015 | Chu et al. |
| 2015/0295818 | A1* | 10/2015 | Hayashitani ........ H04L 41/0896 370/221 |
| 2015/0312135 | A1 | 10/2015 | Velayudhan et al. |
| 2016/0142220 | A1 | 5/2016 | Hao et al. |
| 2016/0142315 | A1 | 5/2016 | Tomonaga et al. |
| 2016/0154756 | A1 | 6/2016 | Dodson et al. |
| 2016/0191361 | A1* | 6/2016 | Behera ................ H04L 43/0882 709/224 |
| 2017/0302504 | A1 | 10/2017 | Wang et al. |

OTHER PUBLICATIONS

Advisory Action for U.S. Appl. No. 15/094,987, dated Sep. 6, 2018, 4 pages.

Ahmadi, Mahmood, et. al., "Hashing Functions Performance in Packet Classification", Computer Engineering Laboratory, Delft University of Technology, Jan. 2007, 6 pages.

Eisenbud, Daniel E., et al., "Maglev: A Fast and Reliable Software Network Load Balancer," 13th USENIX Symposium on Networked Systems Design and Implementation Mar. 16, 2016, 13 pages, USENIX Association, Santa Clara, CA, USA.

Fan, Bin, et al., "Small Cache, Big Effect: Provable Load Balancing for Randomly Partitioned Cluster Services," SOCC'11, 2nd ACM Symposium on Cloud computing, Oct. 27-28, 2011, 12 pages, ACM, Cascais, Portugal.

Final Office Action for U.S. Appl. No. 15/094,987, dated Apr. 4, 2018, 13 pages.

Final Office Action for U.S. Appl. No. 16/048,202, dated Apr. 30, 2020, 22 pages.

Final Office Action for U.S. Appl. No. 16/378,491, dated Sep. 17, 2020, 12 pages.

First Office Action for U.S. Appl. No. 15/094,987, dated Sep. 21, 2017, 16 pages.

First Office Action for U.S. Appl. No. 15/150,015, dated Dec. 29, 2017, 16 pages.

First Office Action for U.S. Appl. No. 15/449,974, dated Jun. 1, 2018, 19 pages.

First Office Action for U.S. Appl. No. 16/048,202, dated Sep. 26, 2019, 21 pages.

First Office Action for U.S. Appl. No. 16/271,624, dated Oct. 31, 2019, 26 pages.

First Office Action for U.S. Appl. No. 16/378,491, dated Feb. 21, 2020, 13 pages.

First Office Action for U.S. Appl. No. 16/548,833, dated Dec. 9, 2020, 14 pages.

Non-Published commonly Owned U.S. Appl. No. 16/048,202, filed Jul. 27, 2018, 49 pages, Barefoot Networks, Inc.

Non-Published Commonly Owned U.S. Appl. No. 16/378,491, filed Apr. 8, 2019, 43 pages, Barefoot Networks, Inc.

Non-Published commonly owned U.S. Appl. No. 16/548,833, filed Aug. 22, 2019, 57 pages, Barefoot Networks, Inc.

Non-Published commonly owned U.S. Appl. No. 17/152,658, filed Jan. 19, 2021, 44 pages, Barefoot Networks, Inc.

Notice of Allowance for U.S. Appl. No. 16/271,624, dated Mar. 17, 2020, 13 pages.

Shantharama, Prateek, et. al., "Hardware-Accelerated Platforms and Infrastructures for Network Functions: A Survey of Enabling Technologies and Research Studies". IEEEAccess, Jul. 29, 2020, 65 pages.

* cited by examiner

IDENTIFYING AND MARKING FAILED EGRESS LINKS IN DATA PLANE

CLAIM OF BENEFIT TO PRIOR APPLICATIONS

This application is a continuation application of U.S. patent application Ser. No. 16/048,202, filed Jul. 27, 2018, which is a continuation application of U.S. patent application Ser. No. 15/150,015, filed May 9, 2016. U.S. patent application Ser. Nos. 15/150,015 and 16/048,202 claim the benefit of U.S. Provisional Patent Application 62/292,498, filed Feb. 8, 2016. The entirety of U.S. patent application Ser. Nos. 15/150,015 and 16/048,202 and U.S. Provisional Patent Application 62/292,498 are hereby incorporated by reference in their entirety.

BACKGROUND

A forwarding element such as a switch or a router can often send packets to a destination through several different egress paths. The forwarding elements utilize different algorithms to identify the best path to send the packets to optimize network congestion as well as transmission time.

Once one of these egress paths fails, the forwarding element has to get notified that the path has failed and mark the path as failed in order to avoid forwarding packets on the failed path. A path may fail due to a port or a wire failure inside the forwarding element or due to a path failure several hops away between the forwarding element and a packet destination.

A typical solution to keep track of the failed paths is using software in the control plane of the forwarding element to keep track of the status of the configured paths and mark a path as failed as soon as the path becomes unavailable. Utilizing software to keep track of and update the list of failed paths is, however, slow. Depending on the load of the processor that is executing the software, marking a path as failed by software may take several milliseconds. Such a delay is not desirable and can cause significant delays in a high-speed forwarding element.

BRIEF SUMMARY

Some embodiments provide a hardware forwarding element (e.g., a hardware switch or a hardware router) with a novel packet-processing pipeline that quickly marks a failed egress path by performing a set of hardware and firmware operations in the data plane. The forwarding element in some embodiments includes an ingress pipeline, a traffic manager, and an egress pipeline. Each one of the ingress and egress pipelines includes a pipeline with a parser, a match-action unit (MAU), and a deparser.

The parser receives the packets coming into the pipeline and produces a packet header vector (PHV) as its output. The PHV provides the input data to the match tables of the MAU. The MAU includes a set of match-action stages. Each of these stages matches a particular set of header fields included in the PHV against a match table and takes an action based on the result of the match. The output PHV is then handed to the deparser, which reassembles the packet by putting back together the output PHV and the payload of the packet that the deparser receives directly from the parser.

The forwarding element also includes a packet generator that is capable of generating packets inside the forwarding element and placing them in the packet pipeline. The packet generator receives the identification of failed paths or ports. For instance, when a port or a wire inside the forwarding element fails, some embodiments generate an interrupt that provides the identification of the failed port (or path). The packet generator in some embodiments also utilizes mechanisms such as keep alive to determine failed paths that are several hops away. Once the packet generator receives the identification of a failed link (i.e., a failed port or a failed path), the packet generator generates a packet that includes the identification of the failed link in a predetermined location in the packet header. The packet goes through the MAU pipeline and matches a predefined match field. The action corresponding to the match field causes an action unit in the forwarding element to use the failed link identification and compute an index to the status bit of the failed link in a data structure and to set the status bit to off (i.e., to indicate that the link has failed).

Some embodiments utilize a process to mark an egress link (i.e., a path or a port) as failed by performing a set of operations that are done by dedicated hardware and firmware in the data plane of the forwarding element. The process receives an indication that an egress link (i.e., a path or a port) of the forwarding element has failed. The process then generates a packet inside the forwarding element and includes an identification of the failed link (i.e., the failed path or port) in a predetermined field of the packet header.

The process then places the packet in the packet pipeline of the forwarding element. The process then parses the packet and places the identification of the failed link in a register of the PHV and forwards the PHV to the MAU. The process matches the identification of the failed link in the PHV with the match field of a match-action entry that is preprogrammed to match the link's identification. Each match field has a corresponding action.

Once the identification of the failed link matches a match field, the process uses an arithmetic logic unit (ALU) to perform the corresponding action of the match-action entry. The process determines the location of the link's status bit in a data structure (e.g., a link status table or a port status table) that keeps track of live and failed links. The process sets the bit at the determined location to off (or failed). The data structure is stored in a dual port memory that is capable of being written directly by hardware. Once the status bit of the failed link is updated, the packet is no longer needed and is dropped.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Software defined networks (SDNs) decouple the data and control planes. The data plane, which is also referred to as forwarding plane or user plane, is the part of the network that carries data packets (i.e., user packets) traffic. In contrast, the control plane in a network controls signaling traffic and routing.

In a forwarding element (e.g., a hardware switch or a hardware router), the data plane is the part of the architecture that decides what to do with the packets that arrive at the ingress interface. The data plane of a forwarding element is implemented by hardware and firmware while the control plane is implemented in software to provide for a more flexible management of network components from a central location. Keeping track of failed paths by the software in the control plane could, however, be time consuming and slow.

Some embodiments provide a hardware forwarding element with a novel packet-processing pipeline that quickly marks a failed egress link by performing a set of hardware operations in the data plane. In the following discussions, the term link is used to refer to a path or a port. The hardware forwarding element of some embodiments includes, among other elements, an ingress pipeline and an egress pipeline. Each of these pipelines includes a parser, a match-action unit (MAU), and a deparser.

Figure 1:
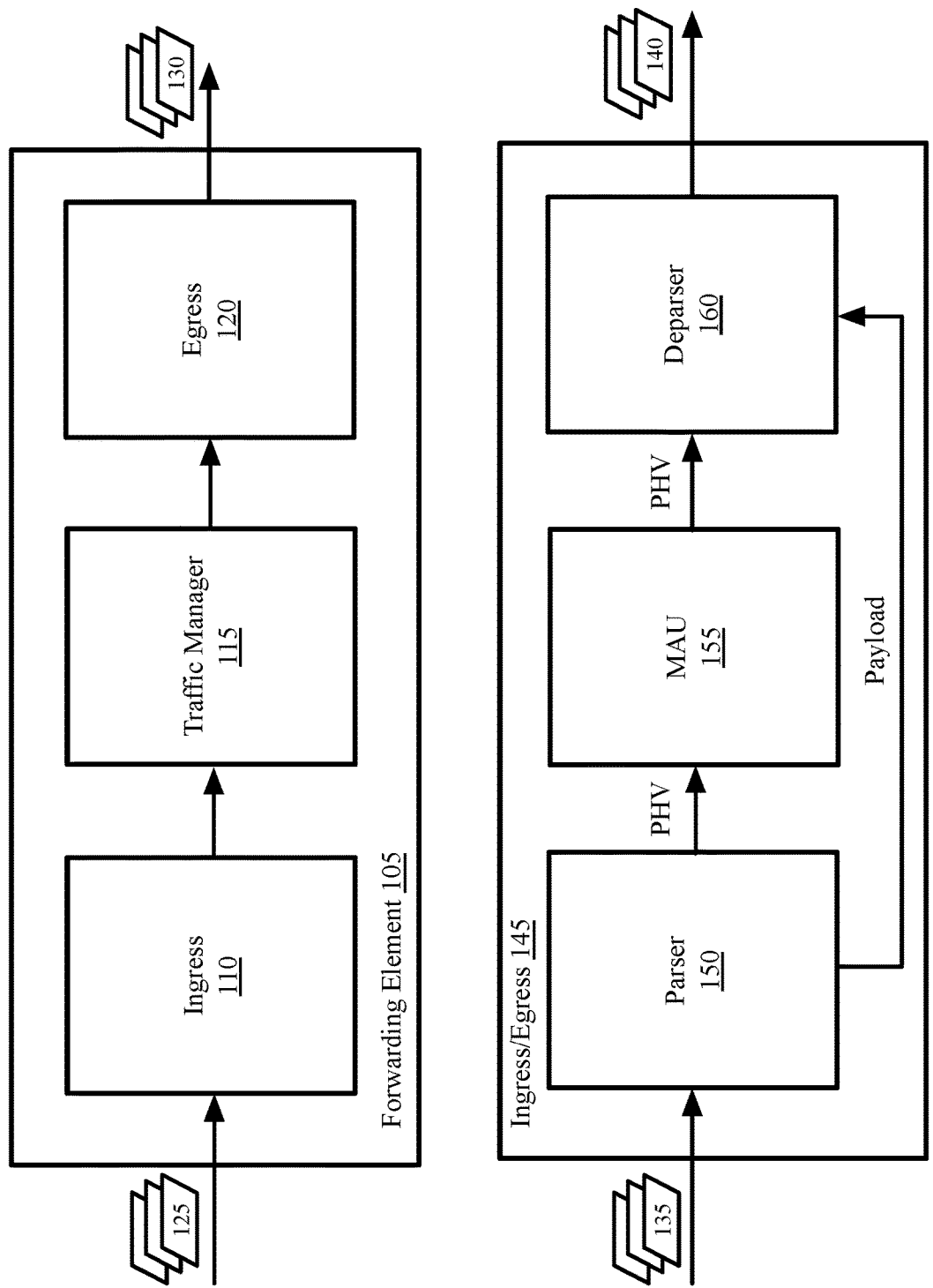
FIG. 1 conceptually illustrates a block diagram of a hardware forwarding element and a block diagram of an ingress/egress pipeline of the hardware forwarding element in some embodiments.

FIG. 1 conceptually illustrates a block diagram of a hardware forwarding element 105 and a block diagram of an ingress or egress pipeline 145 of the hardware forwarding element in some embodiments. As shown, the forwarding element 105 includes an ingress pipeline (or data path) 110, a traffic manager 115, and an egress pipeline 120.

The traffic manager 115 has several components such as a queuing and buffering system, a packet replicator, and a port failure feedback generator. These components are described further below. The ingress pipeline 110 receives packets 125 from a set of channels (e.g., through a set of I/O modules), parses each packet header into a packet header vector (PHV), sends the PHV through a set of match and action stages which may modify the PHV, deparses the packet headers back from the PHV into packet format, and queues the packet in a centralized data buffer (i.e., a data buffer provided by the traffic manager 115). Each one of these operations is described in more detail below by reference to the pipeline 145. The block diagram of both the ingress pipeline 110 and the egress pipeline 120 is similar to the pipeline 145.

In some embodiments, the traffic manager 115 receives the packets that are processed by the ingress pipeline and provides a large shared buffer (storage) that accommodates the queuing delays due to oversubscription of the output channels of the ingress deparser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer of the traffic manager 115 into the egress pipeline 120.

The egress pipeline 120 receives the packets from the traffic manager 115. The parser in egress pipeline separates the packet payload from the packet headers, stores the packets headers in a PHV, sends the PHV through a set of match and action stages, deparses the packet headers back from the PHV into packet format, and sends the packets 130 to an appropriate output port of the forwarding element 105 to be driven off the forwarding element (e.g., through one of the output channels). An output packet may be the same packet as the corresponding input packet (i.e., with identical packet headers), or it may have different packet headers compared to the input packet based on the actions that are applied to the packet headers in the ingress and egress pipelines (e.g., different header field values for certain header fields and/or different sets of header fields).

It should be understood that the illustrated blocks in forwarding element 105 are exemplary only. The ingress, traffic manager, and egress blocks are simplified for ease of description. For example, although the figure shows only one entry point to the ingress parser and one exit point from the egress deparser, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the ingress/egress pipeline 145, some embodiments employ numerous parser blocks (e.g., 16 parser blocks) that feed a match-action unit (MAU) in each pipeline.

FIG. 1 also shows a block diagram 145 of an interface of the hardware forwarding element 105. Each one of the ingress 110 and egress 120 pipelines use an interface similar to the interface 145. The interface includes a pipeline with three different units, namely a parser unit 150, an MAU 155, and a deparser unit 160. The parser 150 of some embodiments receives the incoming packets and produces a packet header vector (PHV) as its output. In other words, the parser 150 separates the packet headers from the packet payload by extracting different fields of packet headers and storing them in the PHV.

In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 150 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The PHV provides the input data to the match tables of the MAU. In some embodiments the MAU 155 includes a set of match-action stages (e.g., 32 match-action stages). Each of these stages matches a particular set of header fields against a match table and takes an action based on the result of the match (e.g., assigning the packet to an output port and queue, dropping the packet, modifying one or more of the header fields, etc.). Based on the actions taken on different header data during the different stages of the MAU 155, the PHV that the MAU outputs might include the same header data as the PHV that the MAU received from the parser, or the output PHV might contain different data than the input PHV.

The output PHV is then handed to the deparser 160. The deparser 160 reassembles the packet by putting back together the output PHV (that might or might not have been modified) that the deparser receives from the MAU 155 and the payload of the packet that the deparser receives directly from the parser 150. The deparser then sends the packets 140 out of the ingress/egress pipeline (to the traffic manager 115 or out of the forwarding element, depending on whether it is the deparser for the ingress pipeline or the egress pipeline).

I. Identifying and Marking Failed Links in Data Plane

Forwarding a packet from a forwarding element to a destination that is several hops away can often be done over several different paths. Once a path is determined to have failed, an alternative path with the same cost (or a path with the least possible cost) is selected to replace the failed path. One such example is equal-cost multi-path (ECMP) routing. Another example is link aggregation (LAG).

A. Forwarding the Packets using ECMP

Figure 2:
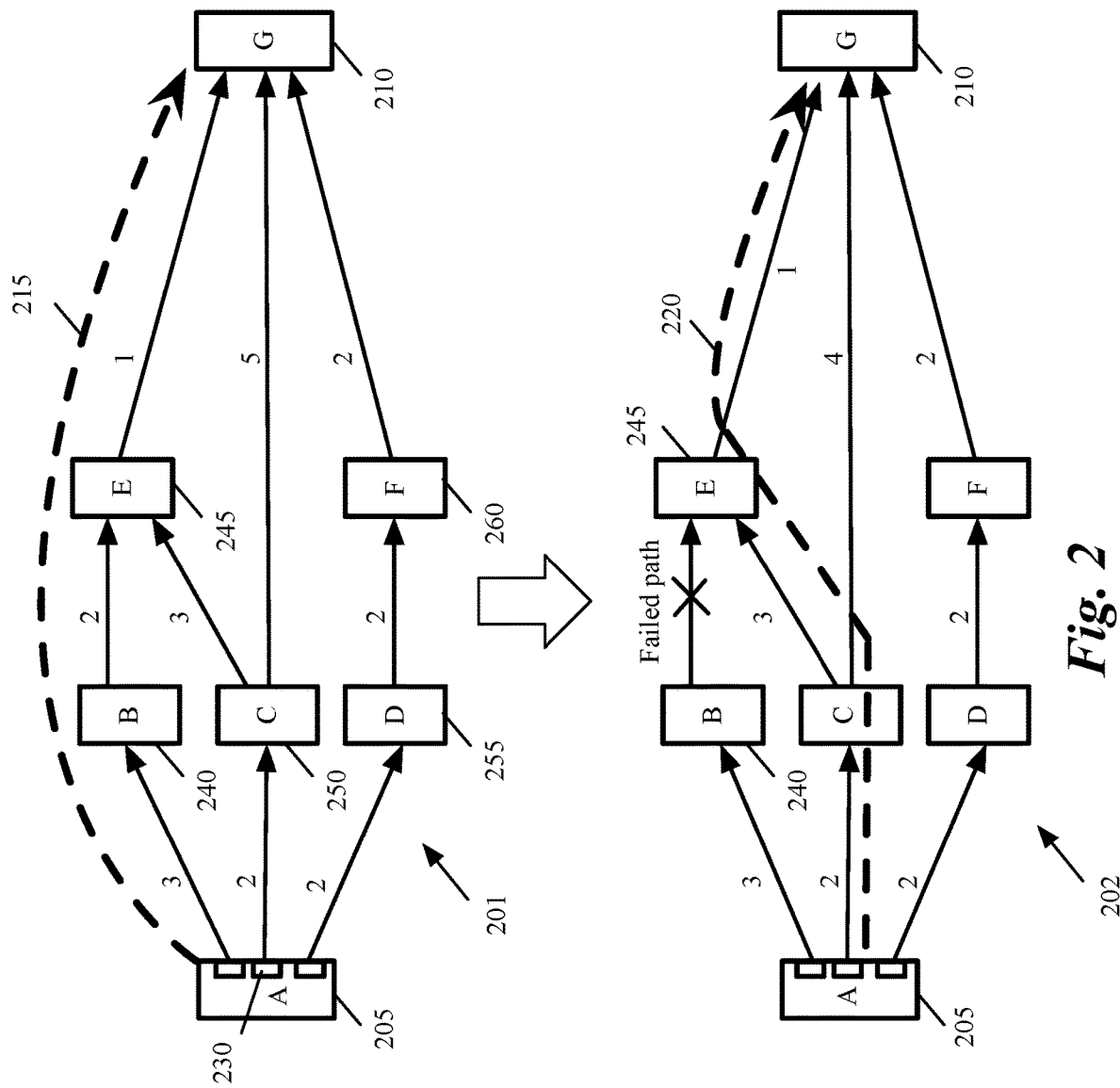
FIG. 2 illustrates ECMP routing for forwarding packets from a forwarding element to a destination over several different paths.

ECMP is a routing strategy that selects the next hop for forwarding a packet to the final destination in such a way to minimize the overall cost (e.g., the required time or the network congestion) for forwarding the packet to the final destination. FIG. 2 illustrates ECMP routing for forwarding packets from a forwarding element 205 to a destination 210 over several different paths through several hops 240-260 that can also be forwarding elements. The figure is shown in two stages 201 and 202. The cost of sending a packet through each path is written next to the path.

As shown, there are several paths such as A-B-E-G, A-C-E-G, and A-D-F-G between source A 205 and destination G 210 that cost 6 units. Each one of these paths is, e.g., a separate open system interconnection (OSI) Layer 3 (L3) path where packets can be sent through. In stage 201 the path A-B-E-G (as shown by arrow 215) is utilized to send packets for one or more flows between source A 205 and destination G 210. As shown, multiple paths can be on the same OSI Layer 2 (L2) port of a forwarding element. For instance, in FIG. 2, both paths A-C-E-G and A-C-G are on port 230 of forwarding element 205.

In stage 202, the path between hops B 240 and E 245 fails. According to ECMP strategy, another route between the source 205 and the destination 210 is selected to keep the transmission cost at a minimum. As shown, forwarding element A 205 selects the path A-C-E-G 220 to replace path 215.

B. Forwarding the Packets using LAG

Figure 3:
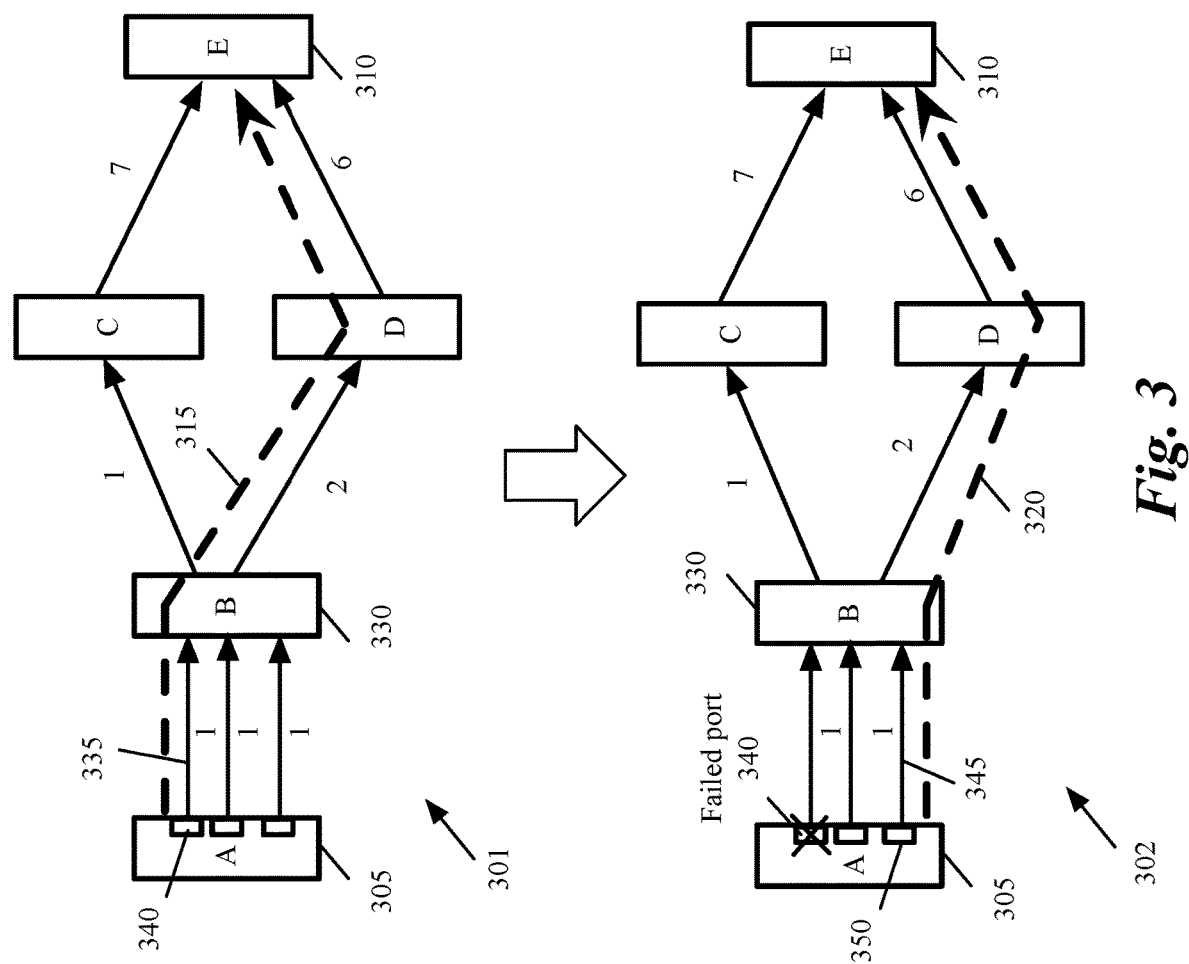
FIG. 3 illustrates link aggregation as another example of forwarding packets from a forwarding element to a destination over several different paths.

FIG. 3 illustrates LAG as another example of forwarding packets from a forwarding element to a destination over several different paths. LAG combines multiple network connections in parallel to provide throughput and redundancy. The figure is shown in two stages 301 and 302. The cost of sending a packet through a path is written next to each path. As shown, there are several paths between forwarding element A 305 and hop B 330 (which could be another forwarding element) that have equal cost. These paths, e.g., use OSI Layer 2 (L2) ports on forwarding element 305 that are on one logical channel bundle. These paths provide parallelism to increase throughput as well as redundancy.

As shown in stage 301, the path A-B-D-E 315, which passes through path 335 between port 340 of forwarding element 305 and hop 330 is used to pass packets for one or more flows from forwarding element A 305 to destination E 310. In stage 302 port 340 fails. As a result, link 335 becomes inaccessible. As shown, another path 320 (which includes the link 345 between port 350 of forwarding element 305 and hop 330) is selected to replace the failed path 315.

In addition to the examples of ECMP and LAG, it is possible that several tunnels go through the same egress port of the forwarding element. Even if the port remains functional, one of the tunnels may fail several hops away downstream. Similar to the examples of FIGS. 2 and 3, the failed path has to be replaced with another path despite the fact that the egress port is still operational.

C. Link Status Table

Some embodiments maintain the status of each egress link of a forwarding element in a data structure that includes a flag (e.g., one bit) per link. The value of the bit indicates whether the corresponding link is up or down. For instance in some embodiments a value of 1 indicates that the corresponding link is operational and a value of 0 indicates that the corresponding link is down. In other embodiments, a value of 0 may be used to indicate that a link is operational and a value of 1 to indicate a link is down.

Figure 4A:
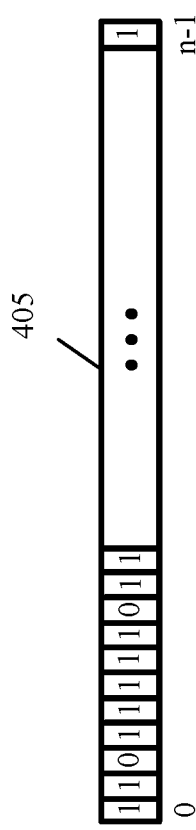
FIG. 4A conceptually illustrates a logical view of a vector that shows the status of the egress links of a forwarding element in some embodiments.

FIG. 4A conceptually illustrates a logical view of a data structure (e.g. a vector) that shows the status of the egress links of a forwarding element in some embodiments. As shown, vector 405 is an array of n bits. Each bit corresponds to a configured egress link (i.e., a port or a path) of the forwarding element. The status of each link is represented by the value of the corresponding bit. When a link is up and operational, the corresponding bit is set to on (e.g., is set to 1) to indicate that the link is live. On the other hand, when a link is down, the corresponding bit is set to off (e.g., is set to 0) to indicate that that link has failed and is not available. Vector 405 in some embodiments is stored in memory as a group of one or more words.

Figure 4B:
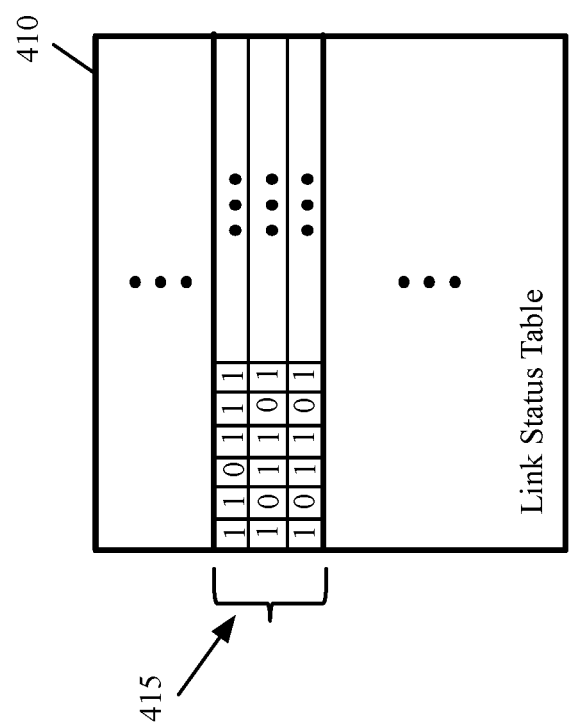
FIG. 4B conceptually illustrates an implementation of the logical vector of FIG. 4A.

FIG. 4B conceptually illustrates an implementation of the logical vector 405 of FIG. 4A. As shown, some embodiments utilize a link status table in an area of memory 410 (referred to herein as the live link vector table) for storing the status of the links. The memory used to store table 410 in some embodiments is a dual port memory that is capable of being read and written by hardware. The dual port memory is also capable of being written by software. In contrast, a random access memory (RAM) is read by hardware but is written only by software. For instance the software writes into a buffer, which is in turn transferred into the RAM.

The dual port memory used to store the live link vector table 410 in some embodiments is implemented from single port static random-access memory (SRAM) units. These embodiments utilize a map RAM (e.g., a small SRAM of 1024 entries by 11 bits) for each unit SRAM. The map RAM stores whether the corresponding unit SRAM has the most up to date data for a memory address. Simultaneous read and write operations are performed as follows.

The read operation is performed by (1) presenting the address to read to all map RAMs, (2) the map RAM with the data to be read signals that its associated unit (e.g., SRAM S1) holds the most up to date data, (3) the unit SRAM S1 is read at the corresponding address. Since the write operation cannot be performed with the same unit where the data currently resides (because the single port of SRAM S1 is occupied by a read), the write is performed by (1) querying the map RAMs to determine which unit SRAM is not busy and has the specified address available for write operation, (2) writing the data to the free SRAM (e.g. SRAM S2), (3) updating the map RAM associated with unit SRAM S2 to indicate unit SRAM S2 has the most up to date version of the data, and (4) updating the map RAM associated with unit SRAM S1 to indicate the address in SRAM S1 is now available for write operations (since the data in SRAM S1 is now stale).

As shown, table 410 includes several groups of live link vectors. Each group is being used by one application (or one user). For instance, group 415 includes several live link vectors (e.g., 128 bits each). Group 415 maintains the status of the links used by one application that utilizes a forwarding element such as forwarding element 105 in FIG. 1.

Once a link such as path 215 in FIG. 2 or port 340 in FIG. 3 fails, a typical solution in prior art forwarding elements is for software in control plane to mark the link as failed and select an alternative link to replace the failed link. Utilizing software to mark a link as failed and determine a replacement link is, however, time consuming and slow. For instance, marking the link as failed by software may take several milliseconds. Accordingly, some embodiments provide a technique to quickly mark a failed link by performing a set of hardware operations in the data link (e.g., in the order of a few microseconds) and route packets to an alternative link without software involvement.

D. Detecting and Marking a Failed Link

Figure 5:
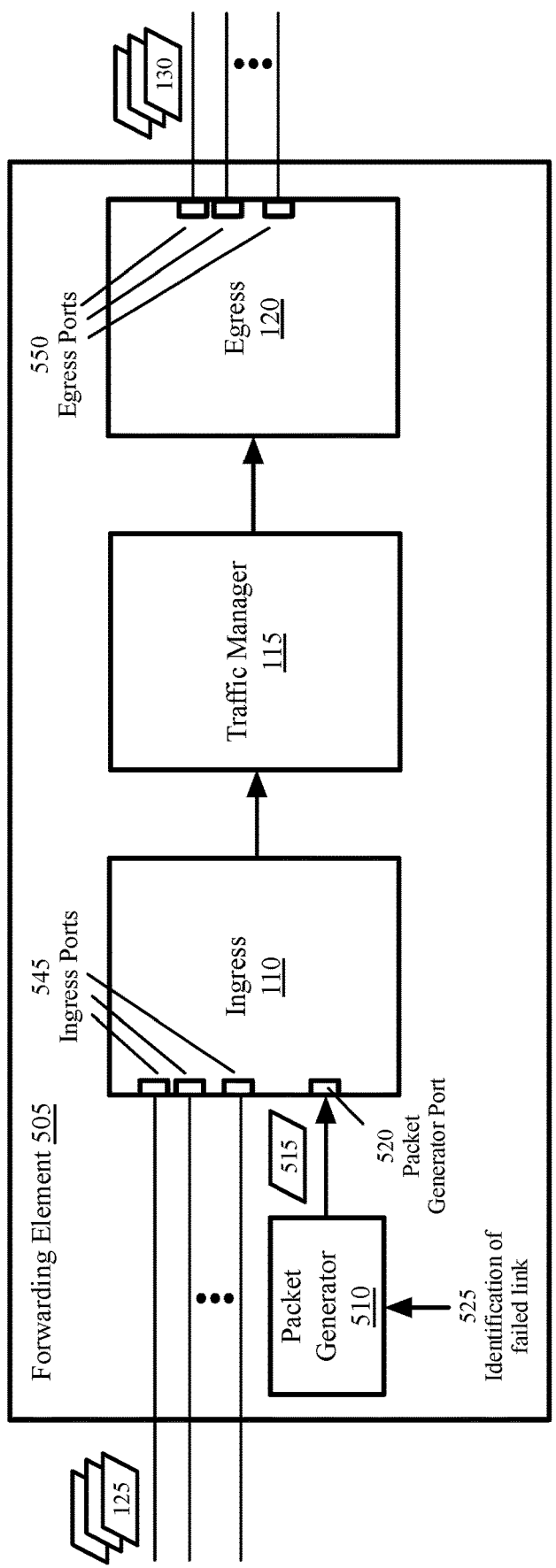
FIG. 5 conceptually illustrates a block diagram of a hardware forwarding element that is capable of marking failed links by performing a set of hardware operations in the data plane in some embodiments.

FIG. 5 conceptually illustrates a block diagram of a hardware forwarding element 505 that is capable of marking failed links by performing a set of hardware operations in the data plane in some embodiments. As shown, in addition to ingress pipeline 110, traffic manager 115, and egress pipeline 120, the forwarding element includes a packet generator 510. The packet generator is capable of generating packets internally in the forwarding element and sending the packets through the packet pipeline. As shown, the ingress packets 125 are received at the ingress pipeline 110 through a set of ingress ports 545 while packets 515 that are generated by the packet generator are received at the ingress pipeline at a separate port 520.

As shown, packet generator 510 receives the identification 525 of failed links. For instance, when a forwarding element's port fails, some embodiments generate an interrupt that provides the identification of the failed port. The interrupt is used to provide the identification of the failed port to the packet generator. As another example, the packet generator may receive an identification of a failed path (such as path 215 in FIG. 2) when a portion of the path that is several hops away fails. For instance, the packet generator receives a hardware signal when the failure of a keep alive signal indicates a portion of an egress path has failed.

Figure 6:
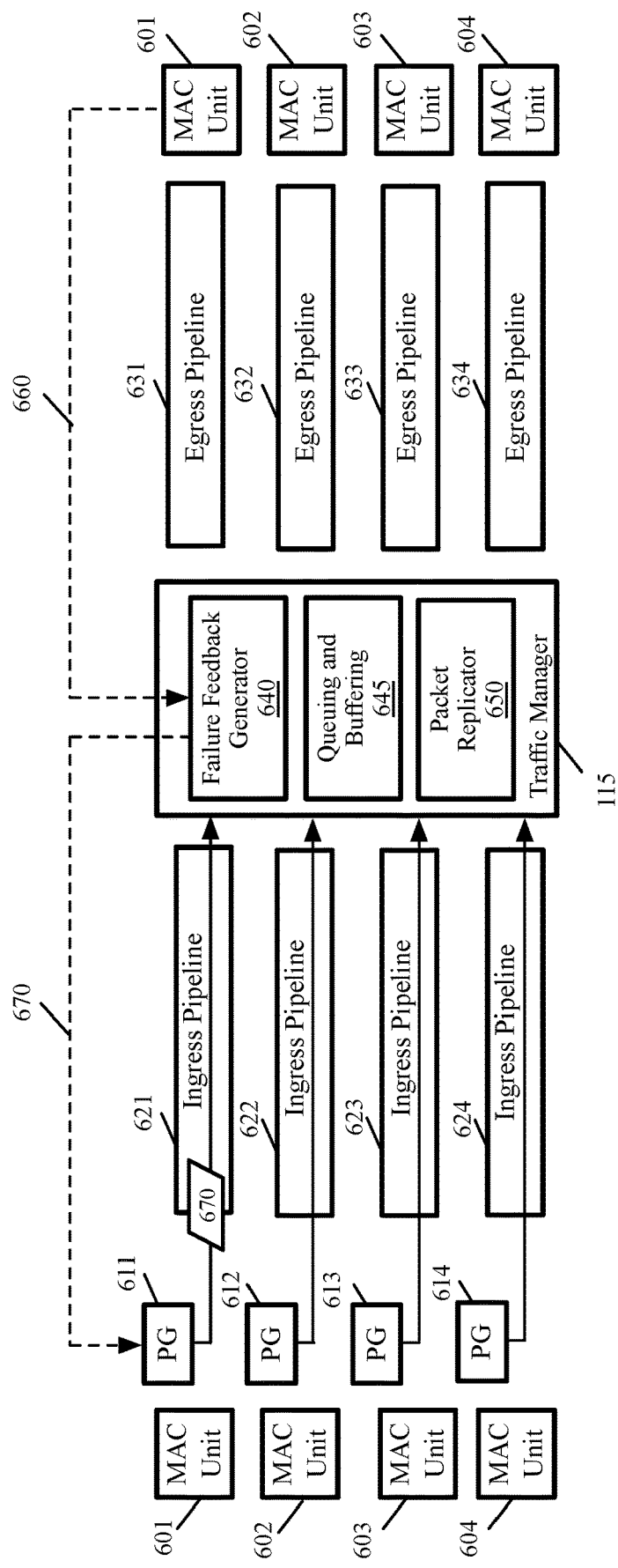
FIG. 6 conceptually illustrates a portion of a hardware forwarding element used for detecting a port failure and reporting the failure to the packet generator in some embodiments.

FIG. 6 conceptually illustrates a portion of a hardware forwarding element used for detecting a port failure and reporting the failure to the packet generator in some embodiments. The figure shows traffic manager 115, several ingress pipelines 621-624 (each pipeline similar to pipeline 110 in FIG. 5), several egress pipelines 631-634 (each pipeline similar to pipeline 120 in FIG. 5), and several packet generators 611-614 (each packet generator similar to packet generator 510 in FIG. 5). Each packet generator 611-614 is associated with one ingress pipeline 621-624. For instance, packet generator 611 is associated with ingress pipeline 621.

The figure also shows several media access control (MAC) units 601-604 to monitor ingress and egress ports. In some embodiments, one MAC unit is utilized for monitoring both the ingress and the egress ports of a pipeline. For instance, the blocks labeled MAC unit 601 next to the ingress pipeline 621 and the egress pipeline 631 are one MAC unit which are shown in FIG. 6 as two separate blocks for clarity. In other embodiments, separate MAC units are utilized to monitor the ingress and egress ports of each pipeline. Once an egress port fails, the corresponding MAC unit 601-604 informs traffic manager 115 using a hardware signal (as conceptually shown by arrow 660).

As shown, traffic manager 115 has several components: a queuing and buffering system 645, a packet replicator 650, and a failure feedback generator 640. As described above, the queuing and buffering system provides a large shared buffer that accommodates the queuing delays due to oversubscription of the output channels of the ingress deparser. Port failure feedback generator 640 receives a hardware signal from the MAC unit that detects a port failure.

In the example of FIG. 6, MAC unit 601 detects that the egress port (not shown) being monitored by the MAC unit has failed. MAC unit 601 sends a signal 660 to the port failure feedback generator 640. The port failure feedback generator 640 in turn generates a hardware signal (as conceptually shown by arrow 670) to the packet generator 611 connected to the ingress pipeline 621 and egress pipeline 631 that are associated with the failed port. The hardware signal includes the identification of the failed port. For instance the port failure feedback generator in some embodiments identifies the failed port based on which MAC unit has reported the failure. In other embodiments, the signal from a MAC unit (e.g., a MAC unit that monitors several ports) to the failure feedback generator includes an identification of the failed port (e.g., in the form of an n bit of information that uniquely identifies the failed port). The failure feedback generator then sends a signal to the packet generator and includes the identification of the failed port (e.g., in the form of an m bit of information that uniquely identifies the failed port).

The packet generator 611 then generates a packet 670 that is placed in ingress pipeline 621. As described below, the packet 670 cause the status bit corresponding the failed port to be set to off. All actions of detecting that a port has failed by a MAC unit (such as MAC unit 601), sending a signal from the MAC unit to the traffic manager 115, sending a signal from the traffic manager to a packet generator (such as packet generator 611), generating a packet (such as packet 670) by the packet generator, and setting the status bit of the failed port to off are done by hardware and firmware in the data plane of the forwarding element without using the control plane or software.

Referring back to FIG. 5, the figure shows one of the ingress pipeline, egress pipeline, and packet generators of FIG. 6. Once the packet generator 510 receives the identification of a failed link, the packet generator generates a packet 515 that includes the identification of the failed link in a predetermined location in the packet header. The packet goes through the MAU match-action stages and matches a predefined match field. The action corresponding to the match field causes a preprogrammed action unit in the forwarding element to use the failed link identification and compute an index to the status bit of the failed link in the live link vector table and to set the bit to off (i.e., to indicate that the link has failed).

The hardware forwarding element of some embodiments processes network packets according to a series of match-action tables that specify when to perform certain operations on the packets. The match-action tables include match entries that specify sets of match conditions that can be met by packets, and corresponding action entries that specify operations to perform on packets that meet the match conditions.

As an example, the match entry of a match-action table might match on the identification of a failed link. The corresponding action entry might specify that the status bit of the link in the live link vector table has to be set to off. As another example, a match-action table might match on the destination address of an ingress packet and specify an output port to which to send the packet. Different destination addresses (i.e., different match entries) correspond to output actions to different ports (i.e., different action entries) of the forwarding element.

In some embodiments, the forwarding element includes a set of unit memories (e.g., SRAM and/or ternary content-addressable memory (TCAM)). The unit memories implement a match-action table by having a first set of the unit memories store the match entries and a second set of the unit memories store the action entries. That is, for a particular match entry and the corresponding action entry, the match entry is stored in a first unit memory and the action entry is stored in a second unit memory.

Some embodiments arrange the unit memories in a grid of rows and columns, with horizontal and vertical routing resources that connects the unit memories to arithmetic logic units (ALUs), also referred to as action units, that read the data from the unit memories in order to perform the match and action operations. In some such embodiments, a first pool of unit memories within a grid (e.g., a set of one or more columns of the grid) are utilized for the match entries, and a second pool of unit memories within the grid are utilized for the action entries. Some embodiments assign other functions of the forwarding element to unit memories within the grid as well, including statistics, meters, state, ternary indirection, etc. In some embodiments, the match memories are segregated (assigned to a specific set of columns, such as those closest to the ALUs) while the remaining memories in the grid are used for implementing memories for other functions (statistics, meters, etc.).

Each match entry of some embodiments includes two portions: the set of match conditions for a packet to meet, and an address of the action entry to read when the set of match conditions is met by a packet. The address, in some embodiments, specifies both a memory page that indicates a unit memory within the grid of unit memories, and a location within that memory page.

Figure 7:
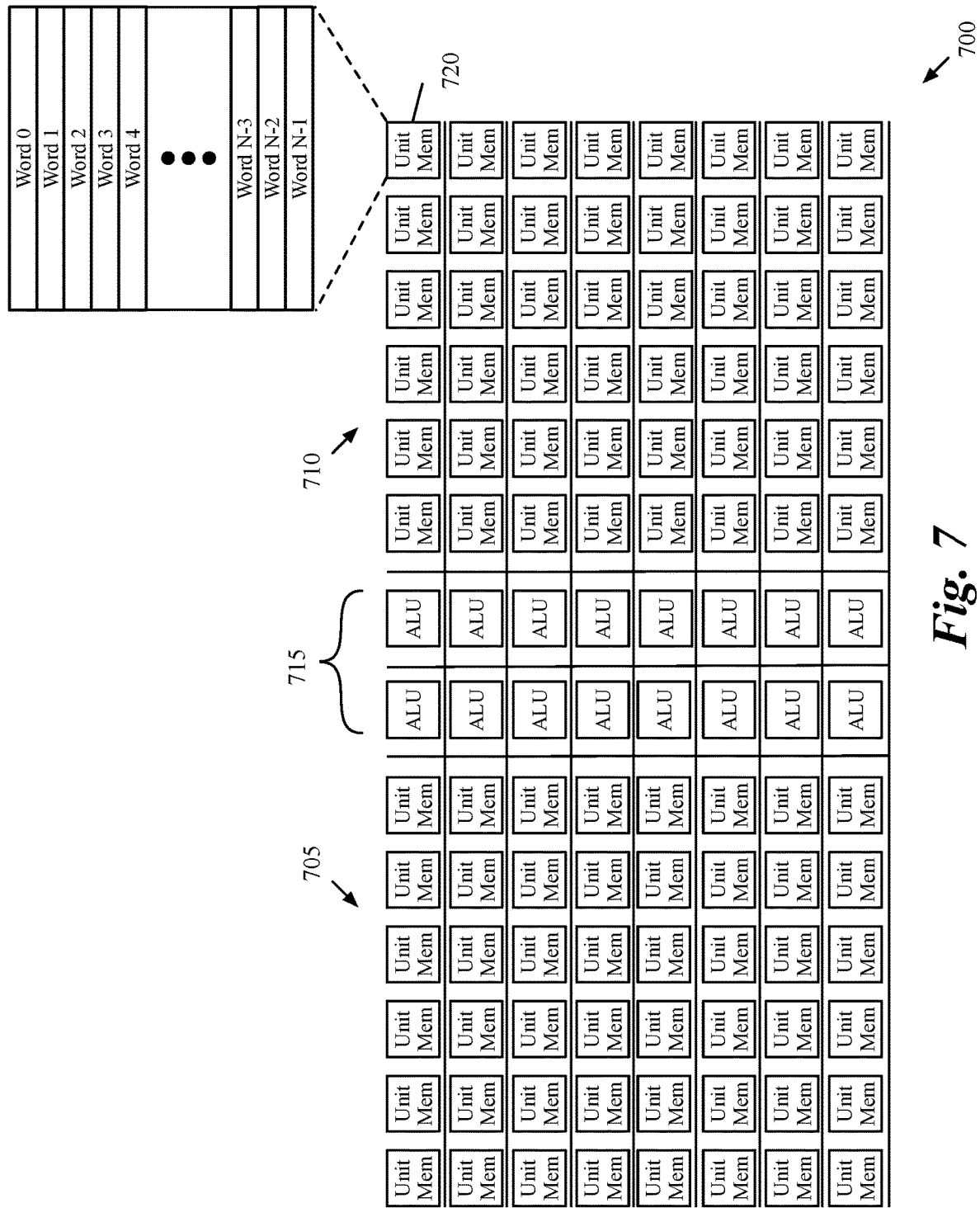
FIG. 7 conceptually illustrates a grid of unit memories in some embodiments.

FIG. 7 conceptually illustrates a grid 700 of unit memories in some embodiments. Specifically, this example shows 96 unit memories arranged in 16 logical rows, with each row associated with an arithmetic logic unit (ALU) 715. The 16 logical rows are divided into two separate grids 705 and 710 of eight rows, having six columns in each of the two separate grids. It should be understood that the arrangement of memories shown in FIG. 7 is only one of many examples of the possible arrangements of unit memories to implement match-action tables in a forwarding element, and that the inventive concepts described herein are applicable to many such arrangements.

These unit memories, in some embodiments, each have a number of memory locations, or "words" that can be read by the ALUs. The wiring that allows ALUs to read from several different rows is described in detail in the U.S. Provisional Application 62/108,409, filed Jan. 27, 2015, which is incorporated herein by reference. As shown for one of the unit memories 720, each memory includes N locations, from Word 0 to Word N-1. In some embodiments, these locations each have a fixed width based on the specific unit memories used in the grid 700, such as 64 bits, 128 bits, 256 bits, etc. The ALUs 715 in some embodiments read one memory location per unit memory in a given clock cycle.

In some embodiments, each of the unit memories has a designated function. For instance, a first unit memory might store match entries, while a second unit memory stores the action entries that correspond to the match entries of the first unit memory. In addition, the unit memories may store other data for a match-action based forwarding element, including meters (used to measure data flow rates) and statistics (e.g., counters for counting packets, bytes, etc.).

Referring back to FIG. 5, the match-action table of the MAU includes a match entry to match the identification of each egress link. Matching the link identification and performing of the corresponding action (if there is a match) is performed by one of the ALUs. The corresponding action entry causes the ALU to use the failed link identification included in the packet and compute an index to the status bit of the failed link in the live link vector table. The action also causes the ALU to set the bit to off (i.e., to indicate that the link has failed). After the live link vector table is updated, the packet is not needed and is dropped without being sent out from one of the egress ports 550.

Figure 8:
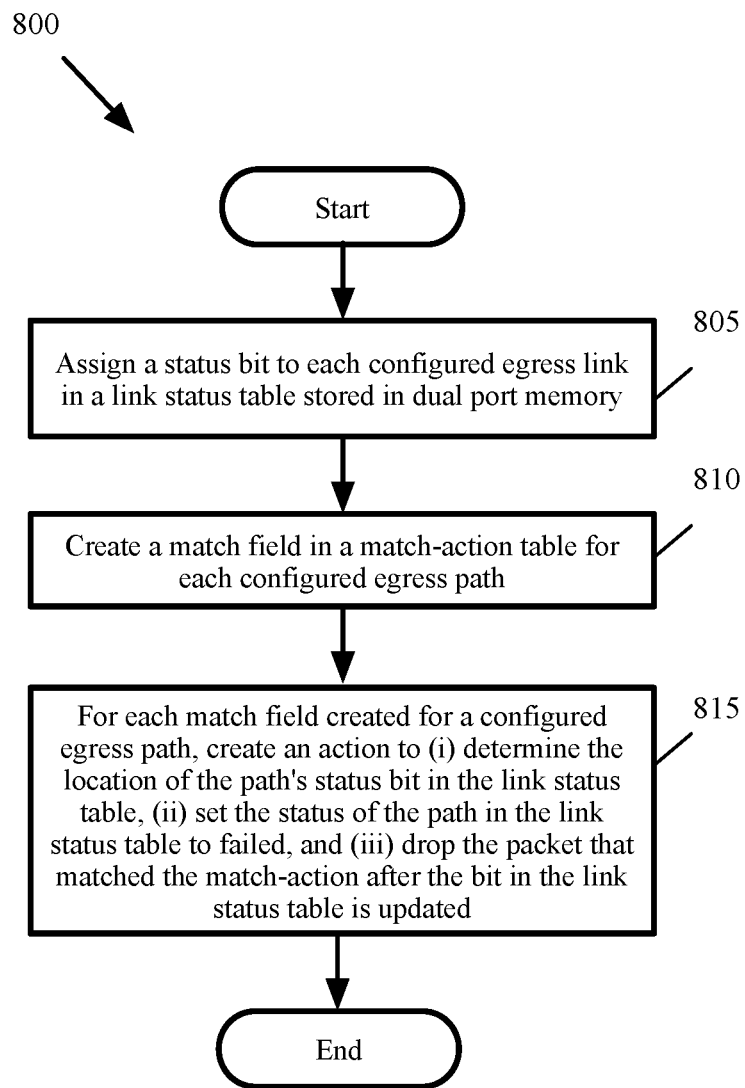
FIG. 8 conceptually illustrates a process for assigning status bits to a forwarding element's egress links and programming match-action entries to set the status of a failed link to failed.

FIG. 8 conceptually illustrates a process 800 for assigning status bits to a forwarding element's egress links and programming match-action entries to set the status of a failed link to failed. Process 800 in some embodiments is performed when the hardware forwarding element is deployed and an initial set of egress links are configured. The process is also performed each time a new link is configured in order to update the match-action table.

As shown, the process assigns (at 805) a status bit in the link status table (e.g., the live link vector table 410 in FIG. 4) for each configured egress link of the forwarding element. As described above, the link status table in some embodiments is stored in dual port memory that is capable of being written by either hardware or software. The process also optionally sets the status of all links to operational (e.g., sets the status bits to 1).

For each configured egress link, the process creates (at 810) a match field in a match-action table of the MAU to match the identification of the link. Next, for each configured egress link, the process creates (at 815) the corresponding action to (i) determine the location of the link's status bit in the link status table based on the link identification in a predetermined field of the packet header, (ii) set the status of the link in the link status table to failed (e.g., to set the bit to 0), and (iii) drop the packet after the bit in the link status table is updated. The process then ends.

Process 800 in some embodiments utilizes a programming language that is designed to program packet forwarding data planes in order to program the match-action table. For instance, some embodiments utilize a programming language such as P4, which is used for programming protocol-independent packet processors. P4 language works in conjunction with protocols such as OpenFlow and is designed to program the match-action tables.

Figure 9:
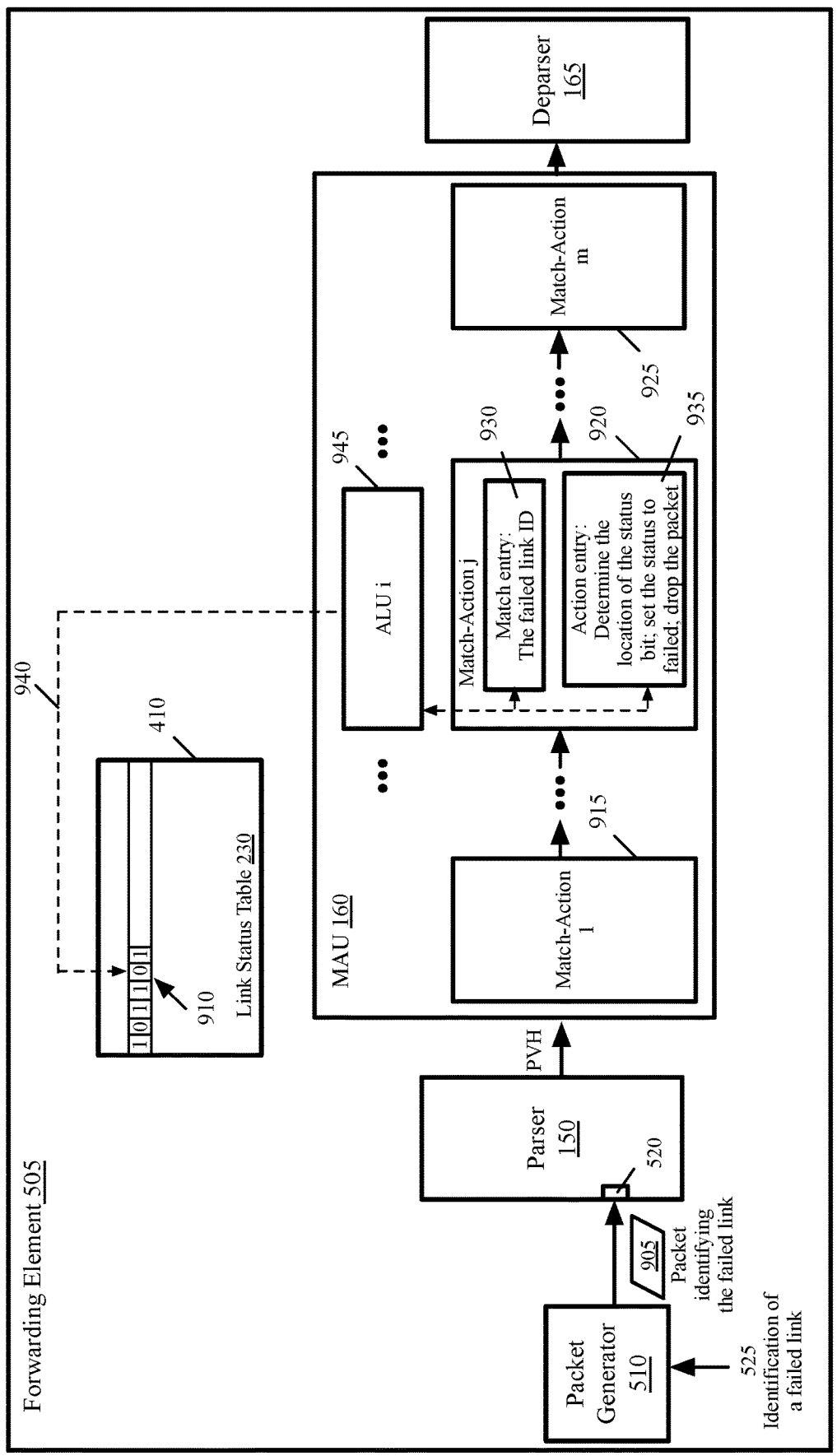
FIG. 9 conceptually illustrates the steps that the hardware forwarding element of FIG. 5 takes to mark a failed link in data plane in some embodiments.

FIG. 9 conceptually illustrates the steps hardware forwarding element 505 of FIG. 5 takes to mark a failed link in data plane in some embodiments. The figure shows the ingress pipeline of the forwarding element. As shown, packet generator 510 receives the identification 525 of a failed egress link (i.e. a failed egress path or port). The packet generator generates a packet 905 that includes the identification of the failed link (or the failed port) in a predetermined field of the packet header. In other words, the packet includes a specific signature for the failed link that is used to match a preprogrammed match field of a match-action table in the MAU. The packet is then placed into the packet pipeline of the forwarding element through the packet generator port 520. The parser 150 then parses the packet header and creates a PHV. One of the registers or containers in the PHV includes the identification of the failed link.

Figure 10:
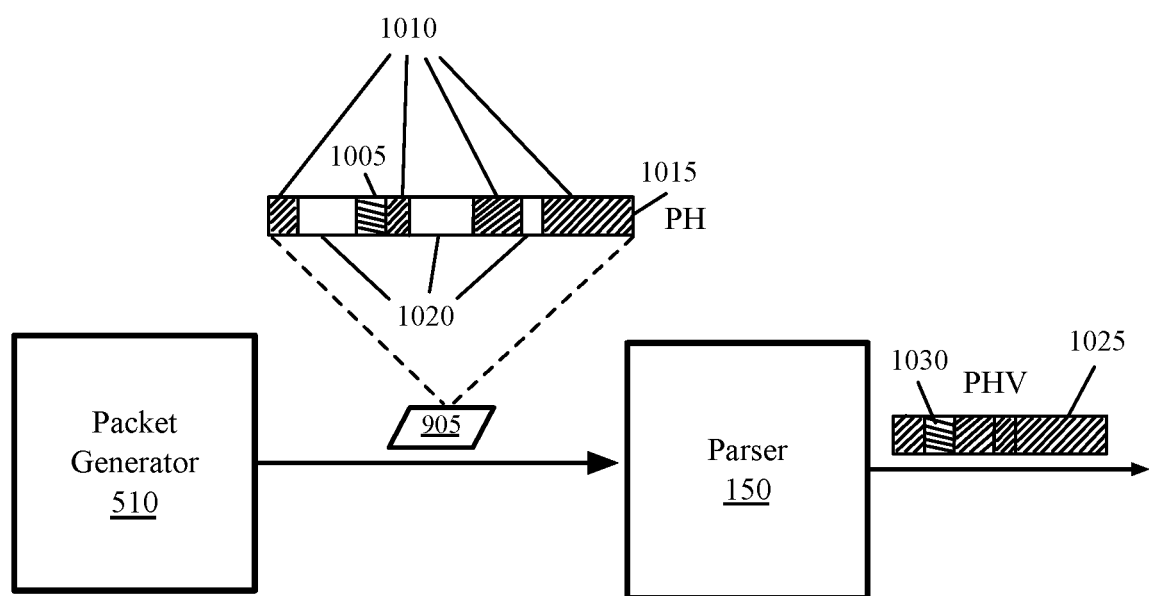
FIG. 10 conceptually illustrates a process that a forwarding element performs in data plane in order set the status of a failed link to failed in some embodiments.

FIG. 10 conceptually illustrates generation of a PHV by a parser from a packet that is generated by a packet generator in some embodiments. As shown, the packet generator 510 generates a packet 905 that includes the identification of the failed link in a predetermined field 1005 of the packet header 1010. In this example, other fields of the packet header do not include relevant information.

When a packet is received by the parser 150, the parser parses the packet headers into the PHV 1025. However, not every header field of each packet header is needed by the MAU stages of the upcoming ingress or egress pipeline to which the parser sends the PHV. For instance, some of the packet header fields will (i) not be matched against by any of the match entries of the match tables in the pipeline and (ii) not be modified by any possible action entry that could be performed in the pipeline. Thus, as the parser 150 extracts each packet header from a packet, the parser determines which of the header fields of the packet header might be processed by at least one of the match-action stages of the MAU.

The illustrated example shows that a packet header 1015 of the packet 905 includes several participating header fields 1005-1010 that the MAU is configured (e.g., by a configurator module of the control plane) to potentially process. At the same time, the packet header 1015 also includes several other non-participating header fields 1020 that the MAU is not configured to process. In some embodiments, when the parser 150 extracts a particular packet header from a packet, the parser must extract the entire contiguous packet header at once (i.e., the parser cannot leave certain fields of a packet header in the payload while placing the other fields of the packet header in the PHV). Because the different participating header fields of the packet header are often not placed next to each other in the packet header (as illustrated in the figure), the parser of some embodiments separates these participating header fields from nonparticipating fields during extraction of the packet header.

For example, the MAU might be configured to process only a particular set of header fields in a UDP packet header, which may not be the first two header fields of the packet header (i.e., the source and destination ports). In such a case, the parser locates the particular header fields in the set, pulls these fields out of the packet header, and stores the header fields in the PHV. However, the other nonparticipating header fields that are also extracted from the packet have to be dealt with as well. Therefore, in some embodiments, the parser looks at each header field in the packet header and determines whether the identified header field might be processed by the MAU or will definitely not be processed by the MAU.

If the parser 150 determines that the header field is one of the participating header fields, the parser stores the header field in the PHV 1025 (i.e., in a particular set of registers or containers of the PHV 1025 designated for that header field). On the other hand, if the parser determines that the identified header field is not supposed to be processed by the MAU, the parser stores the header field in a separate structure (not shown) that is subsequently sent directly to the deparser of the pipeline without getting processed.

The parser of some embodiments determines which fields of each packet header may be processed and which fields will not be processed by the MAU, based on the information the parser receives from the packet itself (e.g., by one or more particular packet header of the packet), and based on the configuration data that is received, for example, from a compiler in the control plane. In some embodiments, the compiler receives the data required for configuring the pipeline (e.g., through a programing language code such as the above-mentioned P4 language), generates a set of configuration data, and distributes the generated data to a configurator module (also in the control plane). The configurator module then distributes the configuration data to both parser and MAU of the pipeline in the forwarding element (e.g., at run-time or during setup time). For the packet 905 that is generated by the packet generator 510 for the purpose of identifying a failed link, the relevant information 1005 is in a predetermined field of the packet header 1015. This information is extracted by the parser 150 and is placed in a predetermined register (or container) 1030 of the PHV 1025.

Referring back to FIG. 9, the PHV passes through the pipeline of match and action stages 915-925. One of these match-action stages 920 is preprogrammed (e.g., as described above by reference to process 800) to match the identification of the failed link included in the PHV. The match entry 930 matches the identification of the failed link. The corresponding action entry 935 includes instructions for an ALU 945 (as described above by reference to FIGS. 7 and 8) to (i) determine the location of the link's status bit in the link status table 230 based on the link identification in a predetermined field of the packet header, (ii) set the status of the link in the link status table to failed (e.g., to set the bit to 0), and (iii) drop the packet after the bit in the link status table is updated.

Depending on the particular implementation of the link status table, the action entry causes the ALU to utilize the identification of the link to calculate an index to the link status table 230. For instance, for the link status table 410 shown in FIG. 4B, the ALU may calculate a pointer to the particular link vector group 415 as well as an offset to the location of the status bit that corresponds to the failed link.

The ALU in some embodiments is capable of performing operations such as writing into map RAM memory used to store the link status table 140. The ALU, therefore, sets (as shown by the dashed arrow 940 in FIG. 9) the status bit 910 that corresponds to the failed link to failed (e.g., to 0). The ALU then drops the packet, as there is not need for the packet to be sent out of an egress port.

Figure 11:
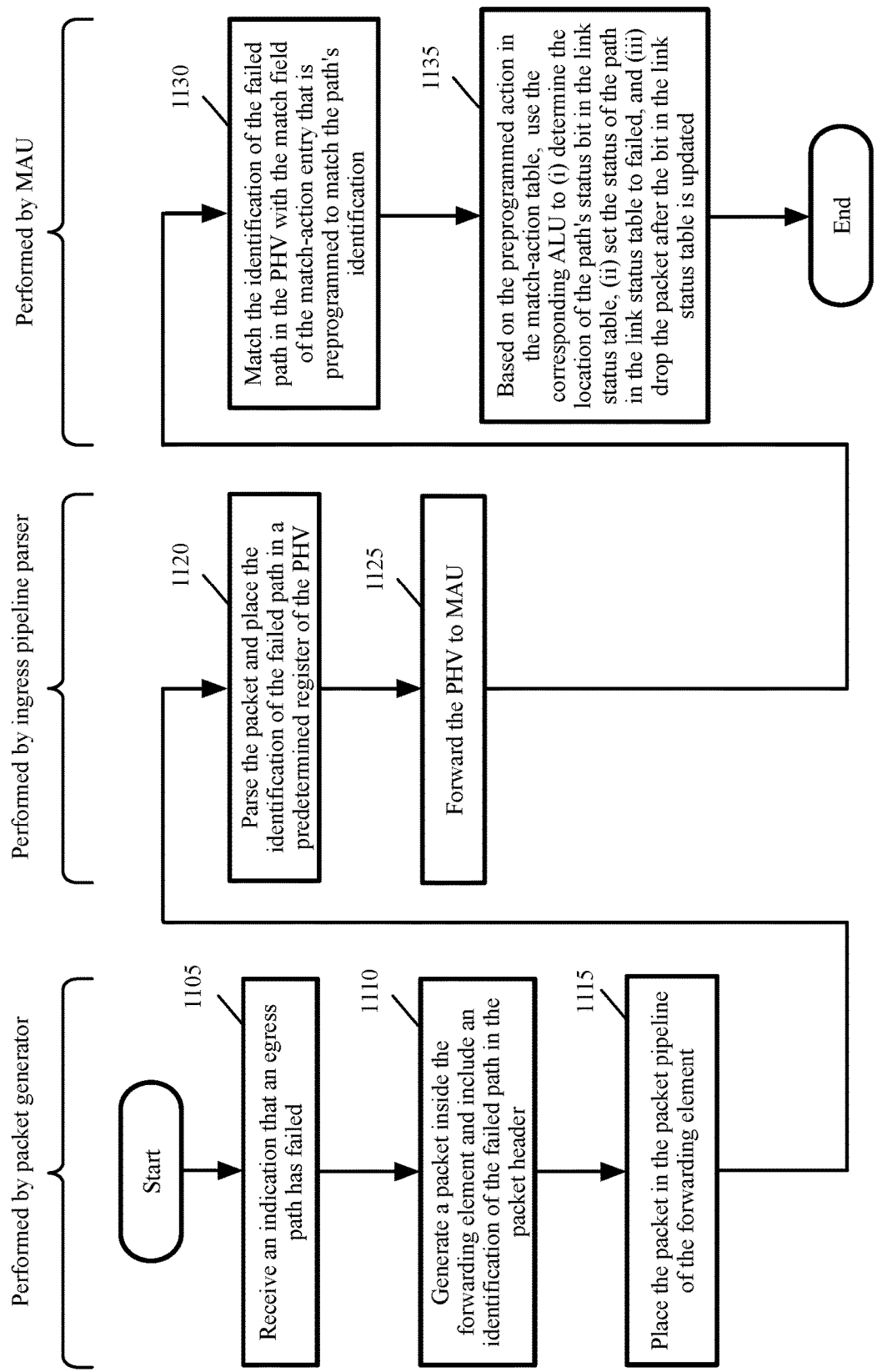
FIG. 11 conceptually illustrates a process that a forwarding element performs in the data plane in order to set the status of a failed link to failed in some embodiments.

FIG. 11 conceptually illustrates a process 1100 that a forwarding element performs in the data plane in order to set the status of a failed link to failed in some embodiments. As shown, different portions of the process are performed by the packet generator, the ingress pipeline parser, and the MAU of the forwarding element.

The process receives (at 1105) an indication (e.g., as shown by 525 in FIGS. 5 and 9) that an egress link of the forwarding element has failed. The process then generates (at 1110) a packet inside the forwarding element (e.g., packet 905 generated by the packet generator 510 in FIG. 9). The process includes an identification (or signature) of the failed link in the packet header. For instance, the process places the identification in the field 1005 of the packet header 1015 as shown in FIG. 10.

The process then places (at 1115) the packet in the packet pipeline of the forwarding element. For instance, the process places packet 905 through the packet pipeline of the forwarding element as shown in FIG. 9. The process then parses (at 1120) the packet and places the identification of the failed link in a predetermined register (or container) of the PHV. For instance, the process generates the PHV 1025 and places the identification of the failed link in a register 1030 of the PHV. The process then forwards (at 1125) the PHV to the MAU.

Next, the process matches (at 1130) the identification of the failed link in the PHV with the match field of the match-action entry that is preprogrammed to match the link's identification. For instance, the process matches the identification of the failed link with the match field 930 as shown in FIG. 9.

As described above, each match field has a corresponding action. Once the identification of the failed link matches a match field, the process uses (at 1135) the action that is preprogrammed for the corresponding ALU to determine the location of the link's status bit in the link status table. For instance, for the link status table 410 shown in FIG. 4B, the process may calculate a pointer to the particular link vector group 415 as well as an offset to the location of the status bit that corresponds to the failed link.

The process also sets the bit at the determined location to fail. For example, the process sets the status bit 910 to 0 as shown in FIG. 9. Once the status bit of the failed link is updated in the link status table, the packet is no longer needed and is dropped. The process then ends.

II. Identifying a Failed Egress Port and Selecting a Backup Port in Data Plane

Some embodiments assign a backup port to each egress port. These embodiments, in data plane perform the followings: identify that a primary egress port has failed, mark the failed port, and redirect the packets that were destined to egress from the failed port to the backup port. Identifying the failed port, marking the failed port, and redirected the packets to the backup port are all done in data plane using hardware and firmware without using the control plane and software.

As described above by reference to FIG. 6, some embodiments detect a failed port by a MAC unit and send a signal to the traffic manager. The traffic manager sends a signal to the packet generator on the pipeline that corresponds to the failed port. The packet generator then generates a packet to mark the failed port in the link status table. The embodiments that utilize backup ports maintain a data structure (referred to herein as port status table) to keep track of the primary and backup ports.

Figure 12:
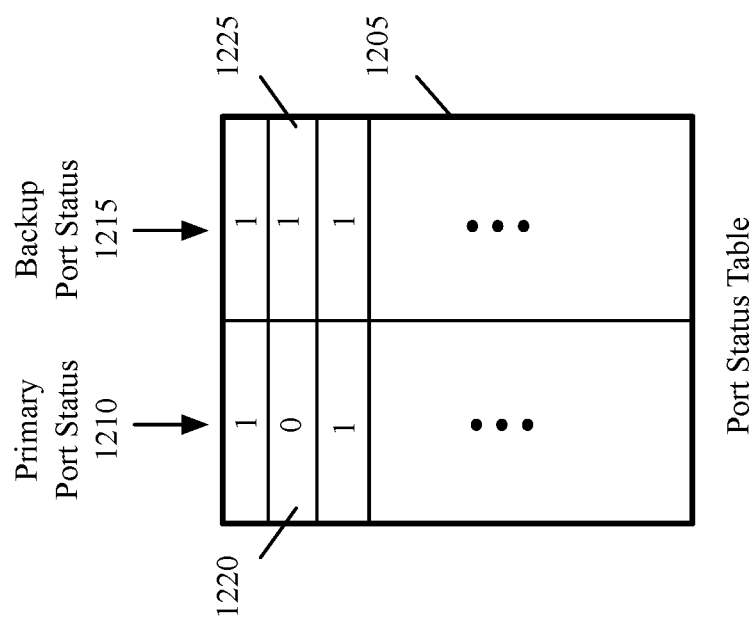
FIG. 12 conceptually illustrates a port status table of some embodiments maintained in dual port memory that is writable by hardware.

FIG. 12 conceptually illustrates a port status table of some embodiments maintained in dual port memory that is writable by hardware. As shown, some embodiments utilize an area of memory 1205 (referred to herein as the port status table) for storing the status of the port pairs. The memory used to store table 1205 in some embodiments is a dual port memory that is capable of being read and written by hardware.

As shown, table 1205 identifies the status 1210 of each primary port and the status 1215 of each backup port. Each port is associated with a flag (e.g., a bit in the table). In the example of FIG. 12, the status 1220 of a primary port is marked as failed (i.e., set to 0) while the status 1225 of the corresponding backup port is on (i.e., set to 1).

Once a port fails, a typical solution in prior art forwarding elements is for software in control plane to mark the port as failed and select an alternative port to replace the failed port. Utilizing software to mark a port as failed and determine a replacement port is, however, time consuming and slow. Accordingly, some embodiments provide a technique to quickly mark a failed port by performing a set of hardware and firmware operations in the data path and route packets to a backup port without software involvement.

Figure 13:
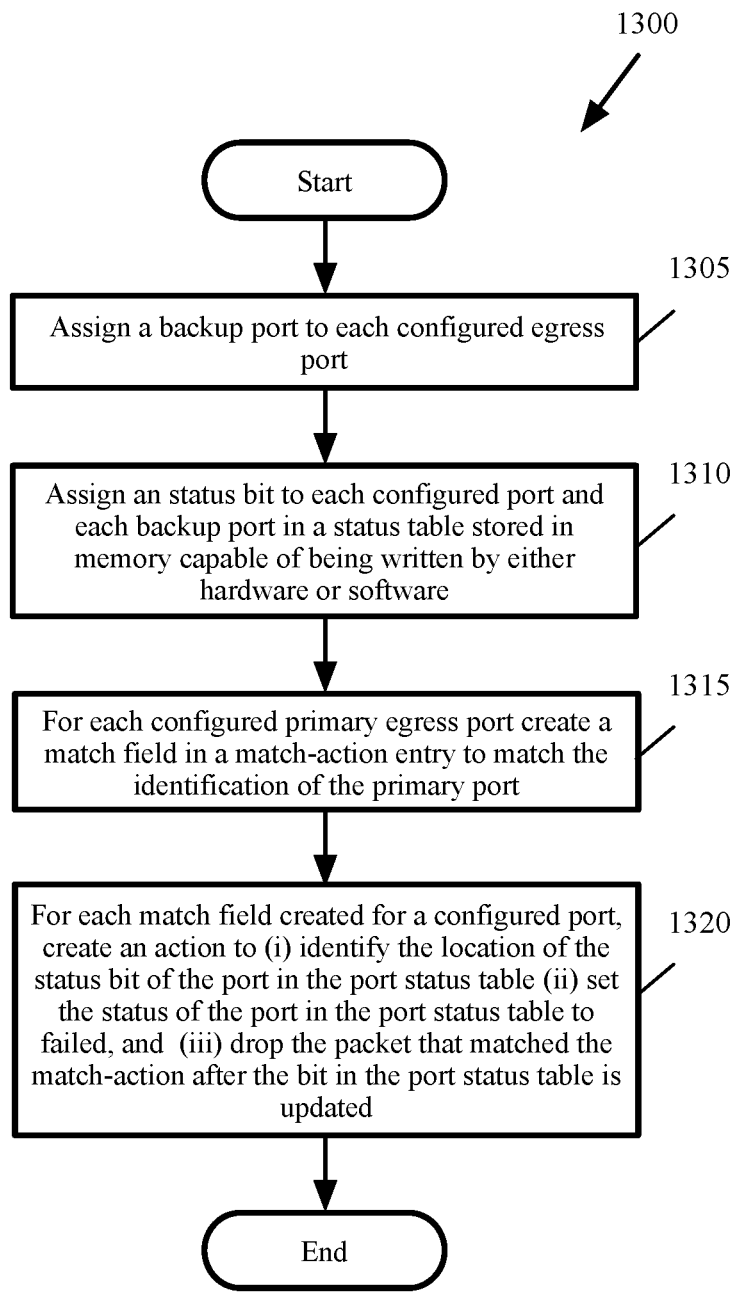
FIG. 13 conceptually illustrates a process for assigning backup egress ports for a forwarding element and programming match-action entries to set the status of a failed port to failed.

FIG. 13 conceptually illustrates a process 1300 for assigning backup egress ports for a forwarding element and programming match-action entries to set the status of a failed port to failed. Process 1300 in some embodiments is performed when the hardware forwarding element is deployed and an initial set of egress ports are configured. The process is also performed each time a new port is configured in order to update the match-action table.

As shown, the process assigns (at 1305) a backup port to each configured egress port. The process then assigns (at 1310) a status bit in a status table (e.g., the port status table 1205 in FIG. 12) to each configured primary port and each configured backup port. The status table is stored in memory that is capable of being written by either hardware or software. The process also optionally sets the status of all ports to operational (e.g., sets the status bits to 1).

For each configured primary port, the process creates (at 1315) a match field in a match-action entry to match the identification of the primary port. For each match field created for a configured port, the process creates (at 1320) an action to (i) identify the location of the status bit of the port in the port status table (ii) set the status of the port in the port status table to failed, and (iii) drop the packet that matched the match-action after the bit in the port status table is updated. The process then ends.

Process 1300 in some embodiments utilizes a programming language that is designed to program packet forwarding data planes in order to program the match-action table. For instance, some embodiments utilize a programming language such as P4, which is used for programming protocol-independent packet processors. P4 language works in conjunction with protocols such as OpenFlow and is designed to program the match-action tables.

Figure 14:
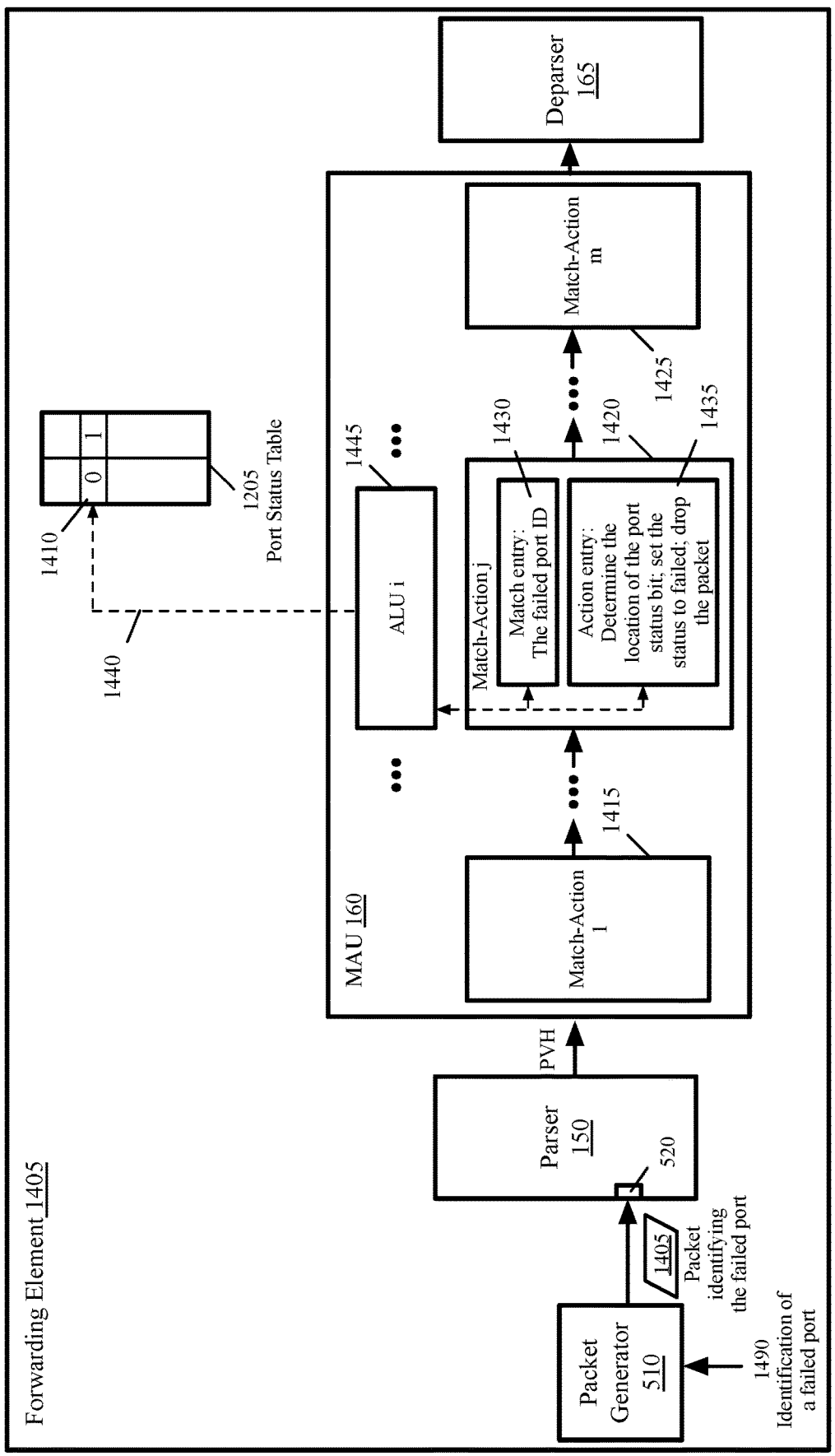
FIG. 14 conceptually illustrates the steps a hardware forwarding element takes to mark a failed port in the data plane in some embodiments.

FIG. 14 conceptually illustrates the steps a hardware forwarding element 1405 takes to mark a failed port in data plane in some embodiments. The figure shows the ingress pipeline of the forwarding element. As shown, packet generator 510 receives an identification 1490 of a failed egress port. The packet generator generates a packet 1405 that includes the identification of the failed port in a predetermined field of the packet header. In other words, the packet includes a specific signature for the failed port that is used to match a preprogrammed match field of a match-action table in the MAU. The packet is then placed into the packet pipeline of the forwarding element through the packet generator port 520. The parser 150 then parses the packet header and creates a PHV. One of the registers or containers in the PHV includes the identification of the failed port. For instance, parser includes the identification of the failed port in a register such as register 1030 of PHV as shown in FIG. 10.

The PHV passes through the pipeline of match and action stages 1415-1425. One of these match-action stages 1420 is preprogrammed (e.g., as described above by reference to process 1300) to match the identification of the failed port included in the PHV. The match entry 1430 matches the identification of the failed port. The corresponding action entry 1435 includes instructions for an ALU 1445 (as described above by reference to FIGS. 7 and 13) to (i) determine the location of the port's status bit in the port status table based on the port identification in a predetermined field of the packet header, (ii) set the status of the port in the port status table to failed (e.g., to set the bit to 0), and (iii) drop the packet after the bit in the port status table is updated.

Depending on the particular implementation of the port status table, the action entry causes the ALU to utilize the identification of the port to calculate an index to the port status table 1410. The ALU in some embodiments is capable of performing operations such as writing into map RAM memory used to store the port status table 1410. The ALU, therefore, sets (as shown by the dashed arrow 1440) the status bit 1410 that corresponds to the failed port to failed (e.g., to 0). The ALU then drops the packet, as there is not need for the packet to be sent out of an egress port.

Figure 15:
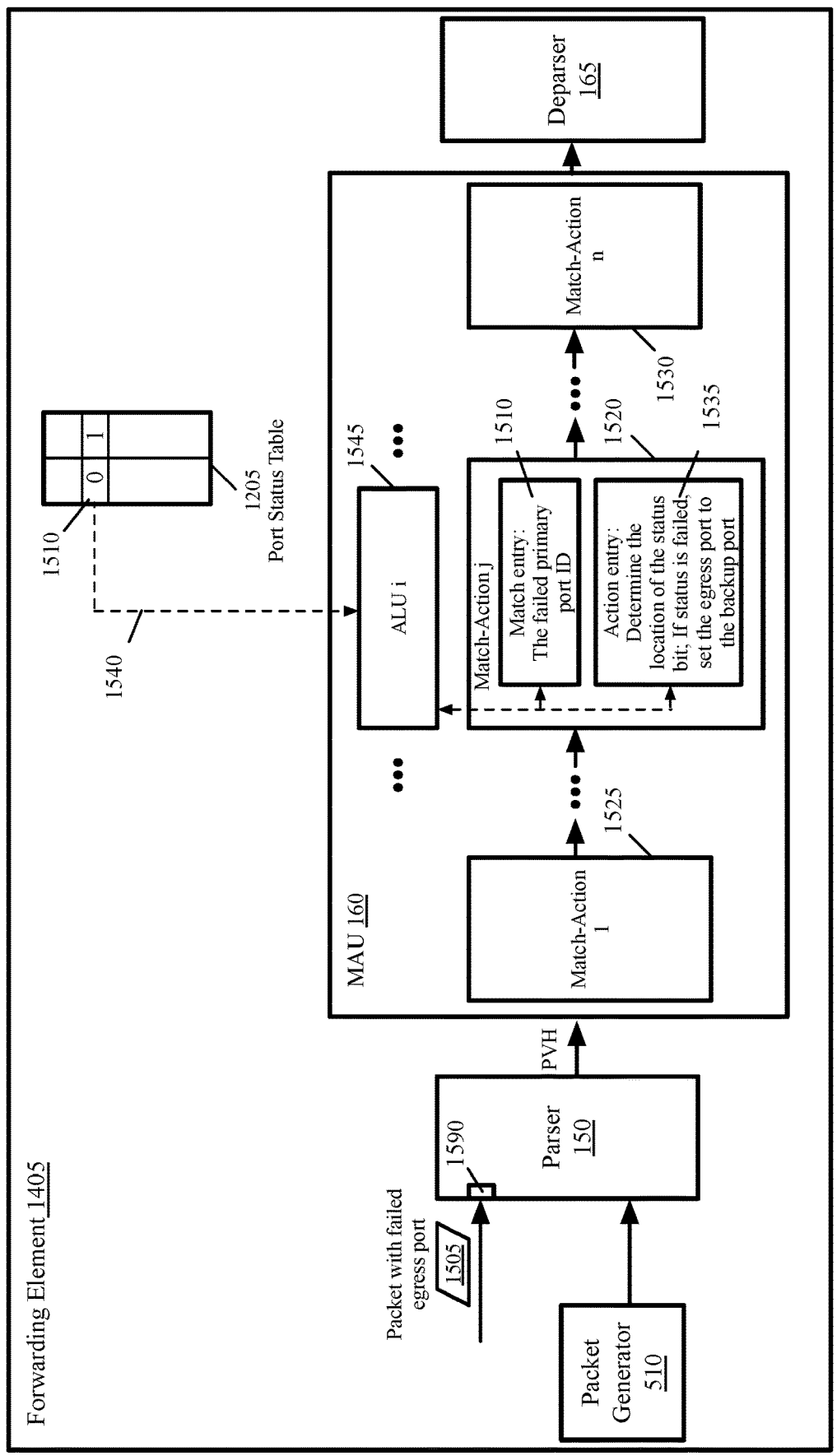
FIG. 15 conceptually illustrates the steps a hardware forwarding element takes to replace a failed primary egress port with a backup port in the data plane in some embodiments.

Once a primary egress port is marked as failed, packets that specify the failed egress port as their destination port are modified to use the backup port. This process is done in the data plane without using the control plane and software. FIG. 15 conceptually illustrates the steps a hardware forwarding element 1405 takes to replace a failed primary egress port with a backup port in data plane in some embodiments. As shown, a packet 1505 is received through an ingress port 1590. Packet 1505 is a data packet (also referred to as a user packet) that is received from outside of the forwarding element 1405. The packet is parsed by parser 150. The parser places the header fields that might be processed by at least one of the match-action stages 1525-1530 in the PHV.

In the example of FIG. 15, the egress port identified in the packet 1505 has failed and the associated status bit 1510 in the port status table 1205 has been set to off. The PHV passes through the pipeline of match and action stages 1525-1530. One of these match-action stages 1520 is preprogrammed to match the identification of the egress port included in the PHV. The match entry 1510 matches the identification of the egress port. The corresponding action entry 1535 includes instructions for an ALU 1545 to (i) determine the location of the port's status bit in the port status table based on the port identification in a predetermined field of the packet header, (ii) check whether the port status is set to failed (e.g., to 0), and (iii) if the port has failed, set the egress port of the packet to the back up port corresponding to the failed port. The packet then proceeds through the ingress and egress pipeline and sent out of the backup egress port.

Figure 16:
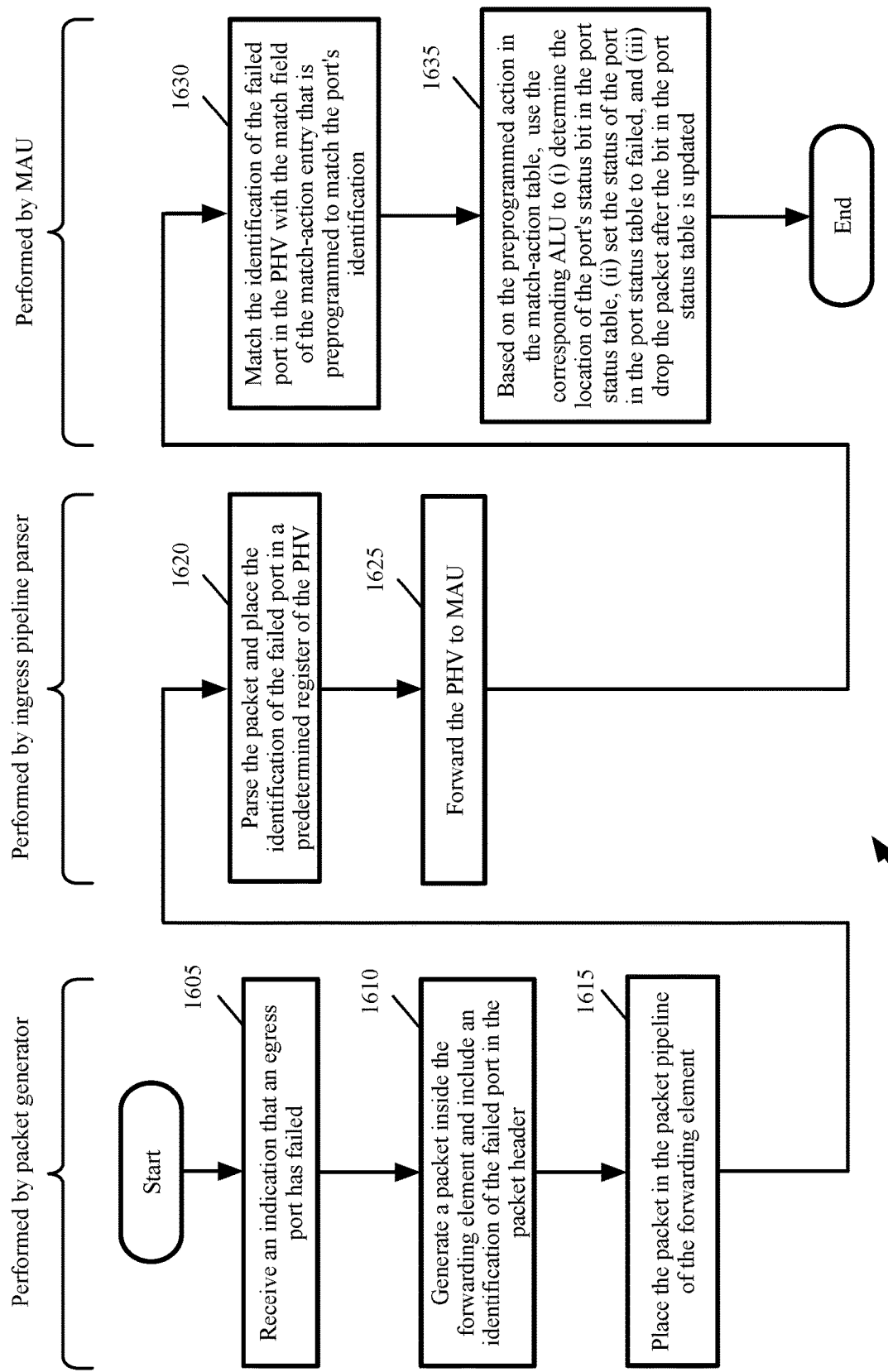
FIG. 16 conceptually illustrates a process that a forwarding element performs in the data plane in order to set the status of a failed port to failed in some embodiments.

FIG. 16 conceptually illustrates a process 1600 that a forwarding element performs in the data plane in order to set the status of a failed port to failed in some embodiments. As shown different portions of the process are performed by the packet generator, the parser, and the MAU of the forwarding element.

The process receives (at 1605) an indication (e.g., as shown by 525 in FIGS. 5 and 14) that an egress port of the forwarding element has failed. The process then generates (at 1610) a packet inside the forwarding element (e.g., packet 1405 generated by the packet generator 510 in FIG. 14). The process includes an identification (or signature) of the failed port in the packet header. For instance, the process places the identification in the field 1005 of the packet header 1015 as shown in FIG. 10.

The process then places (at 1615) the packet in the packet pipeline of the forwarding element. For instance, the process places packet 1405 through the packet pipeline of the forwarding element as shown in FIG. 14. The process then parses (at 1620) the packet and places the identification of the failed port in a predetermined register (or container) of the PHV. For instance, the process generates the PHV 1025 and places the identification of the failed port in a register 1030 of the PHV. The process then forwards (at 1625) the PHV to the MAU.

Next, the process matches (at 1630) the identification of the failed port in the PHV with the match field of the match-action entry that is preprogrammed to match the port's identification. For instance, the process matches the identification of the failed port with the match field 1430 as shown in FIG. 14.

As described above, each match field has a corresponding action. Once the identification of the failed port matches a match field, the process uses (at 1635) the action that is preprogrammed for the corresponding ALU to determine the location of the port's status bit in the port status table. For instance, for the port status table 1205 shown in FIG. 12, the process may calculate an offset to the location of the status bit that corresponds to the failed port.

The process also sets the bit at the determined location to fail. For example, the process sets the status bit 1410 to 0 as shown in FIG. 14. Once the status bit of the failed port is updated in the port status table, the packet is no longer needed and is dropped. The process then ends.

III. Computer System

Figure 17:
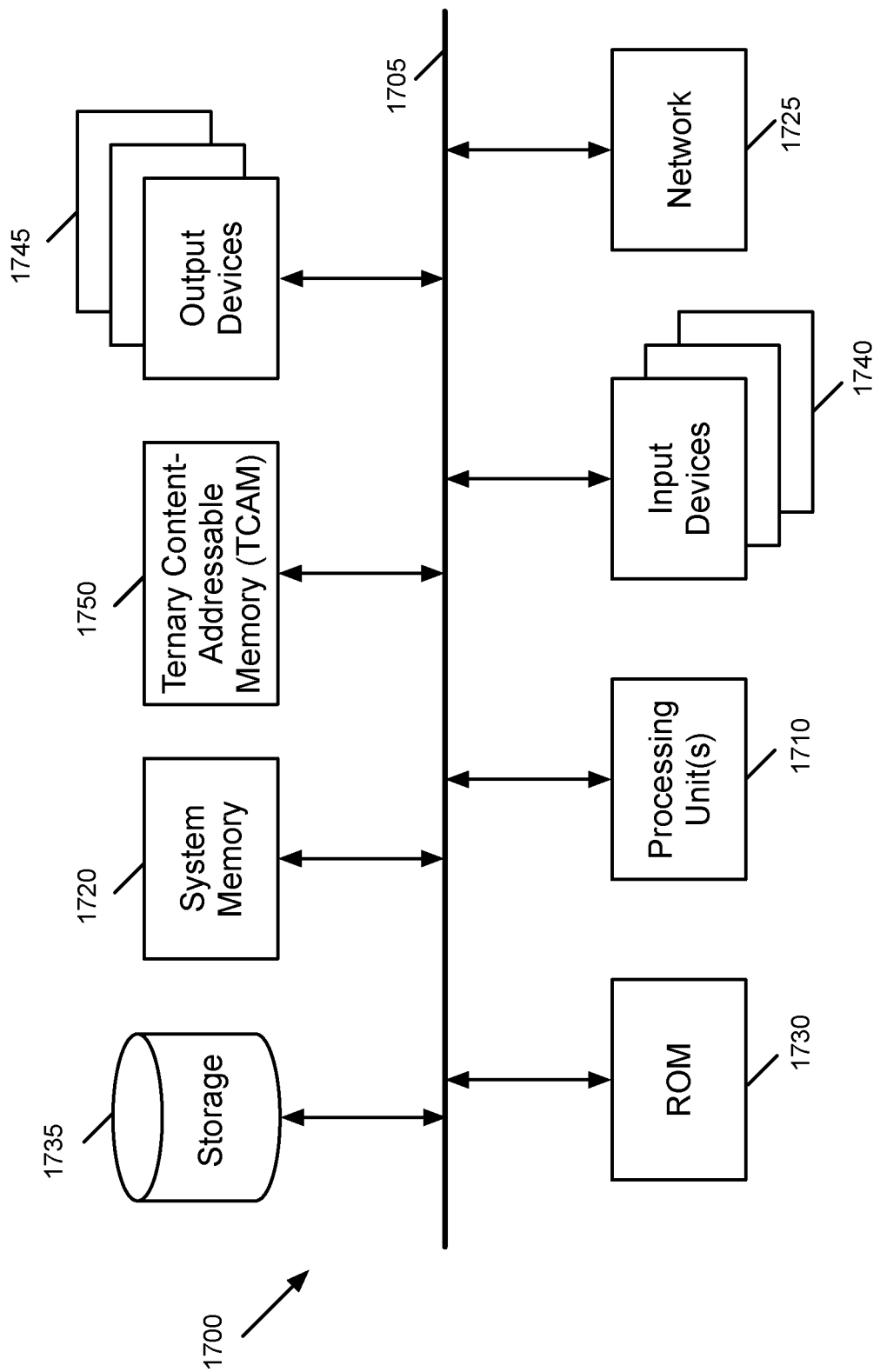
FIG. 17 conceptually illustrates an electronic system with which some embodiments of the invention are implemented.

FIG. 17 conceptually illustrates an electronic system 1700 with which some embodiments of the invention are implemented. The electronic system 1700 can be used to execute any of the control, virtualization, or operating system applications described above. The electronic system 1700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1700 includes a bus 1705, processing unit(s) 1710, system memory 1720, read-only memory (ROM) 1730, permanent storage device 1735, input devices 1740, output devices 1745, and TCAM 1750.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1720, and the permanent storage device 1735.

From these various memory units, the processing unit(s) 1710 retrieve instructions to execute and data to process in order to execute the processes of the invention. The processing unit(s) may be a single processor or a multi-core processor in different embodiments.

The read-only-memory 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1720 is a read-and-write memory device. However, unlike storage device 1735, the system memory is a volatile read-and-write memory, such a random access memory. The system memory stores some of the instructions and data that the processor needs at runtime. In some embodiments, the invention's processes are stored in the system memory 1720, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 8, 11, 13, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

The invention claimed is:

1. A network switch integrated circuit for use in packet forwarding in a network, the network switch integrated circuit comprising:

ingress packet data processing pipeline hardware and egress packet data processing pipeline hardware for use in matching header field data of packet data associated with one or more packets received by the network switch integrated circuit to programmable match-action table data to determine one or more packet processing-related actions that correspond to the header field data, the one or more packet processing-related actions to be carried out in processing of the packet data;

shared buffer memory to be shared between the ingress packet data processing pipeline hardware and the egress packet data processing pipeline hardware for use in (1) storage of received packet data from the ingress packet data processing pipeline hardware and (2) provision of the received packet data to the egress packet data processing pipeline hardware;

wherein:
the ingress packet data processing pipeline hardware and the egress packet data processing pipeline hardware comprise respective pluralities of packet data processing pipelines;
when the network switch integrated circuit is in operation:
the programmable match-action table data is programmable based upon software-generated configuration data to be provided to the network switch integrated circuit;
the network switch integrated circuit is to implement the one or more packet processing-related actions;
the one or more packet processing-related actions are associated with equal-cost multi-path routing;
the one or more packet processing-related actions are programmable to comprise:
one or more operations to modify at least one packet header; and
one or more next hop determination operations;
the network switch integrated circuit is to generate flow-related information and statistics-related information usable in association with software-defined networking;
the flow-related information is related to data flow rate; and
the statistics-related information is related to packet count information, and byte count information.

2. The network switch integrated circuit of claim 1, wherein:
the network switch integrated circuit comprises ternary content addressable memory to store the programmable match-action table data.

3. A non-transitory machine-readable storage medium storing instructions that are executable by a network switch integrated circuit, the network switch integrated circuit being for use in packet forwarding in a network, the network switch integrated circuit comprising ingress packet data processing pipeline hardware and egress packet data processing pipeline hardware, the network switch integrated circuit also comprising buffer memory that is to be shared between the ingress packet data processing pipeline hardware and the egress packet data processing pipeline hardware, the instructions, when executed by the network switch integrated circuit resulting in the network switch integrated circuit being configured to perform operations comprising:
matching, by the ingress packet data processing pipeline hardware and the egress packet data processing pipeline hardware, header field data of packet data associated with one or more packets received by the network switch integrated circuit to programmable match-action table data to determine one or more packet processing-related actions that correspond to the header field data, the one or more packet processing-related actions to be carried out in processing of the packet data;
storing, in the buffer memory, received packet data from the ingress packet data processing pipeline hardware; and
providing, from the buffer memory, the received packet data to the egress packet data processing pipeline hardware; and
wherein:
the ingress packet data processing pipeline hardware and the egress packet data processing pipeline hardware comprise respective pluralities of packet data processing pipelines;
when the network switch integrated circuit is in operation:
the programmable match-action table data is programmable based upon software-generated configuration data to be provided to the network switch integrated circuit;
the network switch integrated circuit is to implement the one or more packet processing-related actions;
the one or more packet processing-related actions are associated with equal-cost multi-path routing;
the one or more packet processing-related actions are programmable to comprise:
one or more operations to modify at least one packet header; and
one or more next hop determination operations;
the network switch integrated circuit is to generate flow-related information and statistics-related information usable in association with software-defined networking;
the flow-related information is related to data flow rate; and
the statistics-related information is related to packet count information, and byte count information.

4. The non-transitory machine-readable storage medium of claim 3, wherein:
the network switch integrated circuit comprises ternary content addressable memory to store the programmable match-action table data.

5. A method implemented by a network switch integrated circuit, the network switch integrated circuit being for use in packet forwarding in a network, the network switch integrated circuit comprising ingress packet data processing pipeline hardware and egress packet data processing pipeline hardware, the network switch integrated circuit also comprising buffer memory that is to be shared between the ingress packet data processing pipeline hardware and the egress packet data processing pipeline hardware, the method comprising:
matching, by the ingress packet data processing pipeline hardware and the egress packet data processing pipeline hardware, header field data of packet data associated with one or more packets received by the network switch integrated circuit to programmable match-action table data to determine one or more packet processing-related actions that correspond to the header field data, the one or more packet processing-related actions to be carried out in processing of the packet data;
storing, in the buffer memory, received packet data from the ingress packet data processing pipeline hardware; and providing, from the buffer memory, the received packet data to the egress packet data processing pipeline hardware; and wherein:
- the ingress packet data processing pipeline hardware and the egress packet data processing pipeline hardware comprise respective pluralities of packet data processing pipelines;
- when the network switch integrated circuit is in operation:
  - the programmable match-action table data is programmable based upon software-generated configuration data to be provided to the network switch integrated circuit;
  - the network switch integrated circuit is to implement the one or more packet processing-related actions;
  - in a configuration, the one or more packet processing-related actions are associated with equal-cost multi-path routing;
- the one or more packet processing-related actions are programmable to comprise:
  - one or more operations to modify at least one packet header; and
  - one or more next hop determination operations;
- the network switch integrated circuit is to generate flow-related information and statistics-related information usable in association with software-defined networking;
- the flow-related information is related to data flow rate; and
- the statistics-related information is related to packet count information, and byte count information.

6. The method of claim 5, wherein:
the network switch integrated circuit comprises ternary content addressable memory to store the programmable match-action table data.

* * * * *